(12) United States Patent
Chatani

(10) Patent No.: US 6,540,610 B2
(45) Date of Patent: *Apr. 1, 2003

(54) SYSTEM FOR AND METHOD OF PROCESSING DATA, AND ENTERTAINMENT SYSTEM

(75) Inventor: Masayuki Chatani, Tokyo (JP)

(73) Assignee: Sony Computer Entertainment Inc., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/396,090

(22) Filed: Sep. 14, 1999

(65) Prior Publication Data

US 2002/0065135 A1 May 30, 2002

(30) Foreign Application Priority Data

Sep. 16, 1998 (JP) ............................................. 10-262016

(51) Int. Cl.[7] ................................................ A63F 13/00
(52) U.S. Cl. ....................................... 463/31; 273/148 B
(58) Field of Search .............................. 463/40, 41, 42, 463/43, 44, 46, 47, 48, 31; 273/148 B

(56) References Cited

U.S. PATENT DOCUMENTS

| 4,521,014 A | * | 6/1985 | Sitrick |
| 4,572,509 A | * | 2/1986 | Sitrick |
| 4,688,105 A | * | 8/1987 | Bloch et al. |
| 4,710,873 A | * | 12/1987 | Breslow et al. |
| 4,858,930 A | * | 8/1989 | Sato |
| 5,184,830 A | * | 2/1993 | Okada et al. |
| 5,393,073 A | * | 2/1995 | Best |
| 5,396,225 A | * | 3/1995 | Okada et al. |
| 5,428,528 A | * | 6/1995 | Takenouchi et al. |
| 5,553,864 A | * | 9/1996 | Sitrick |
| 5,595,389 A | * | 1/1997 | Parulski et al. |
| 5,618,045 A | * | 4/1997 | Kagan et al. |
| 5,897,437 A | * | 4/1999 | Nishiumi et al. |
| 6,061,532 A | * | 5/2000 | Bell |
| 6,120,379 A | * | 9/2000 | Tanaka et al. |
| 6,132,315 A | * | 10/2000 | Miyamoto et al. |
| 6,139,432 A | * | 10/2000 | Watanabe et al. |

FOREIGN PATENT DOCUMENTS

| EP | 0 756 225 | | 1/1997 |
| JP | 10 200802 | | 7/1998 |
| WO | 97/08888 | * | 3/1997 |

* cited by examiner

*Primary Examiner*—Michael O'Neill
(74) *Attorney, Agent, or Firm*—Frommer Lawrence & Haug LLP; William S. Frommer; Darren M. Simon

(57) ABSTRACT

A portable computer is removably connected to a video game machine which processes data, and a digital camera is connected to the video game machine. Image data supplied from the portable computer or the digital camera to the video game machine is processed or combined by the video game machine, and the processed or combined image data is outputted to the portable computer or the digital camera. The portable computer and the digital camera, which are difficult to connect directly to each other, are simultaneously connected to the video game machine for sending and receiving image data between the portable computer and the digital camera.

2 Claims, 31 Drawing Sheets

FIG. 33   441

CONTROL ITEMS

APPARATUS CONNECTION INTERFACE

MEMORY INTERFACE

DISPLAY INTERFACE

CONTROL INPUT INTERFACE

SOUND INTERFACE

WIRELESS COMMUNICATION INTERFACE

CLOCK MANAGEMENT INTERFACE

PROGRAM DOWNLOAD INTERFACE

SYSTEM FOR AND METHOD OF PROCESSING DATA, AND ENTERTAINMENT SYSTEM

BACKGROUND OF THE INVENTION

1. Field of the Invention

The present invention relates to a system for and a method of processing data and an entertainment system for sending data to and receiving data from an external device, and more particularly to a system for and a method of processing data and an entertainment system which are preferably applicable to a system comprising a video game machine and a personal digital assistant (PDA).

2. Description of the Related Art

Home consoles such as personal computers can read image data captured by a digital camera and use the read image data when the digital camera is connected to the home consoles. When a small computer such as a personal digital assistant is connected to personal computers, the personal computers can send and receive various data such as image data to and from the small computer.

The home consoles include conventional video game machines such as television game devices. The conventional video game machines, which are in widespread use, read game data from a recording medium or an auxiliary storage unit, and run an application program on a video game machine processor based on the read game data to play a competition game, for example, in response to command signals entered from a command unit known as a manual controller operated by the game player.

Many video game machines generally have an excellent image and sound data processing capability so that the users can experience complex and realistic images and sounds. Specifically, the excellent image and sound data processing capability of video game machines allows complex game characters to be displayed and realistic voice sounds to be reproduced for the video game, and can present finer and more complex images and sounds than possible with existing computers.

Heretofore, for a conventional home console such as a personal computer to read image data captured by a digital camera, it has been customary to taken into account only the transfer of data between the home console and the digital camera. There has not been established any system for performing simultaneous communications between a home console, a digital camera, and a small computer such as a personal digital assistant according to an application program recorded in a recording medium.

For transferring image data captured by a digital camera to a small computer, it is necessary to convert the image data to a format that can be used by the small computer. When the small computer and the digital camera are connected directly to each other, however, it has been difficult to transfer the data efficiently from the digital camera to the small computer because of limited computational resources of the small computer.

Though the conventional video game machines have an excellent data processing capability, as described above, the conventional video game machines remain only a device for executing an application program to play a video game. There have not been established any system in which a small computer and a digital camera are simultaneously connected to a video game machine for sending and receiving image data and processing image data, and any system which effectively utilizes the real-time graphic computing and displaying functions of the video game machine.

Furthermore, any application program run by a small computer to use image data has not been provided by a recording medium that is loaded in a device to which both the small computer and a digital camera are connected.

SUMMARY OF THE INVENTION

It is therefore an object of the present invention to provide a system for and a method of processing data and an entertainment system, which allow a slave unit and a digital camera to be simultaneously connected to a master unit for sending and receiving image data between the slave unit and the digital camera which are difficult to connect directly to each other.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 33 is a diagram showing control items controlled by a control means in the portable electronic device.

DESCRIPTION OF THE PREFERRED EMBODIMENTS

Figure 1:
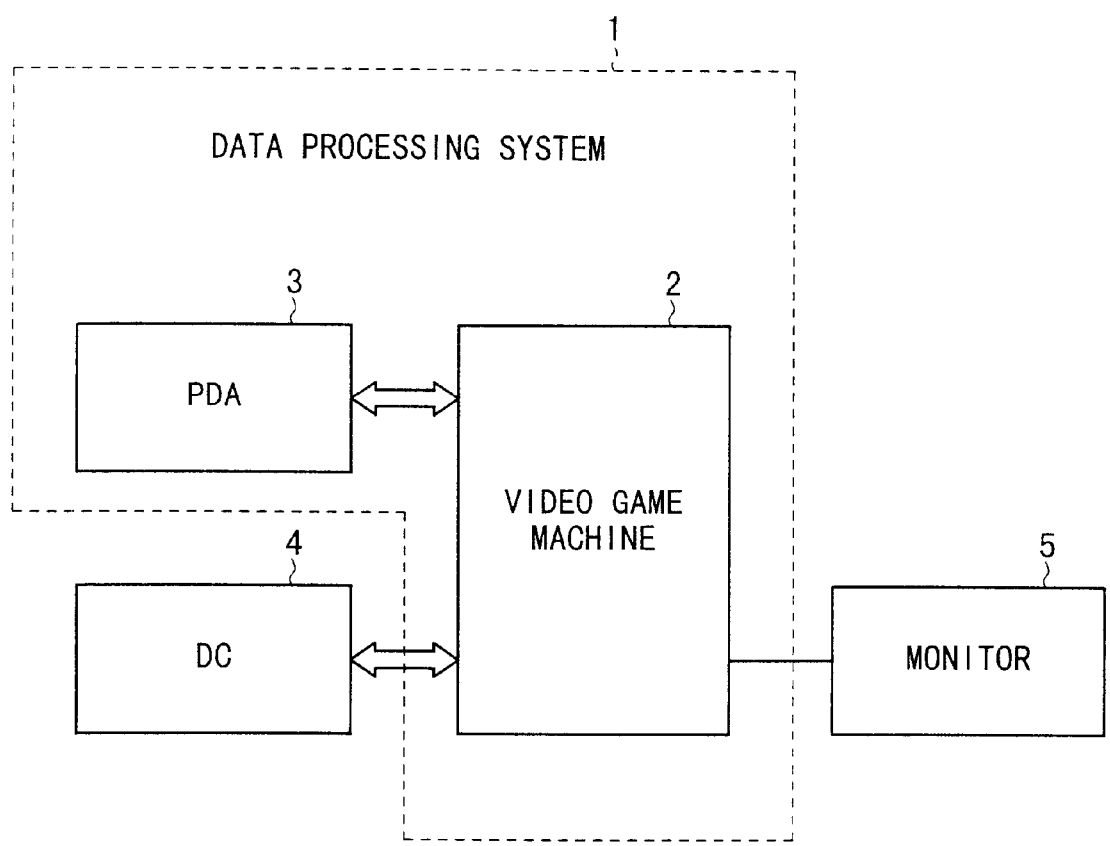
FIG. 1 is a block diagram of a data processing system according to the present invention.

As shown in FIG. 1, a data processing system 1 according to the present invention comprises a video game machine 2 and a portable computer (PDA) 3 connected to the video game machine 2.

In the data processing system 1, the video game machine 2 serves as a master unit for processing data and the portable computer 3 serves as a slave unit. The video game machine 2 is arranged as an entertainment system which executes program data recorded in a recording medium (not shown) such as a CD-ROM, a DVD, or the like to perform a video game or the like. The portable computer 3 is removably connected to the video game machine 2 for sending data to and receiving data from the video game machine 2, and arranged as a personal digital assistant (PDA) having a wireless communication function. To the video game machine 2, there are connected a digital camera (DC) 4 as an imaging device capable of capturing images, and a video monitor 5 as a display unit for displaying processed results from the video game machine 2.

Figure 2:
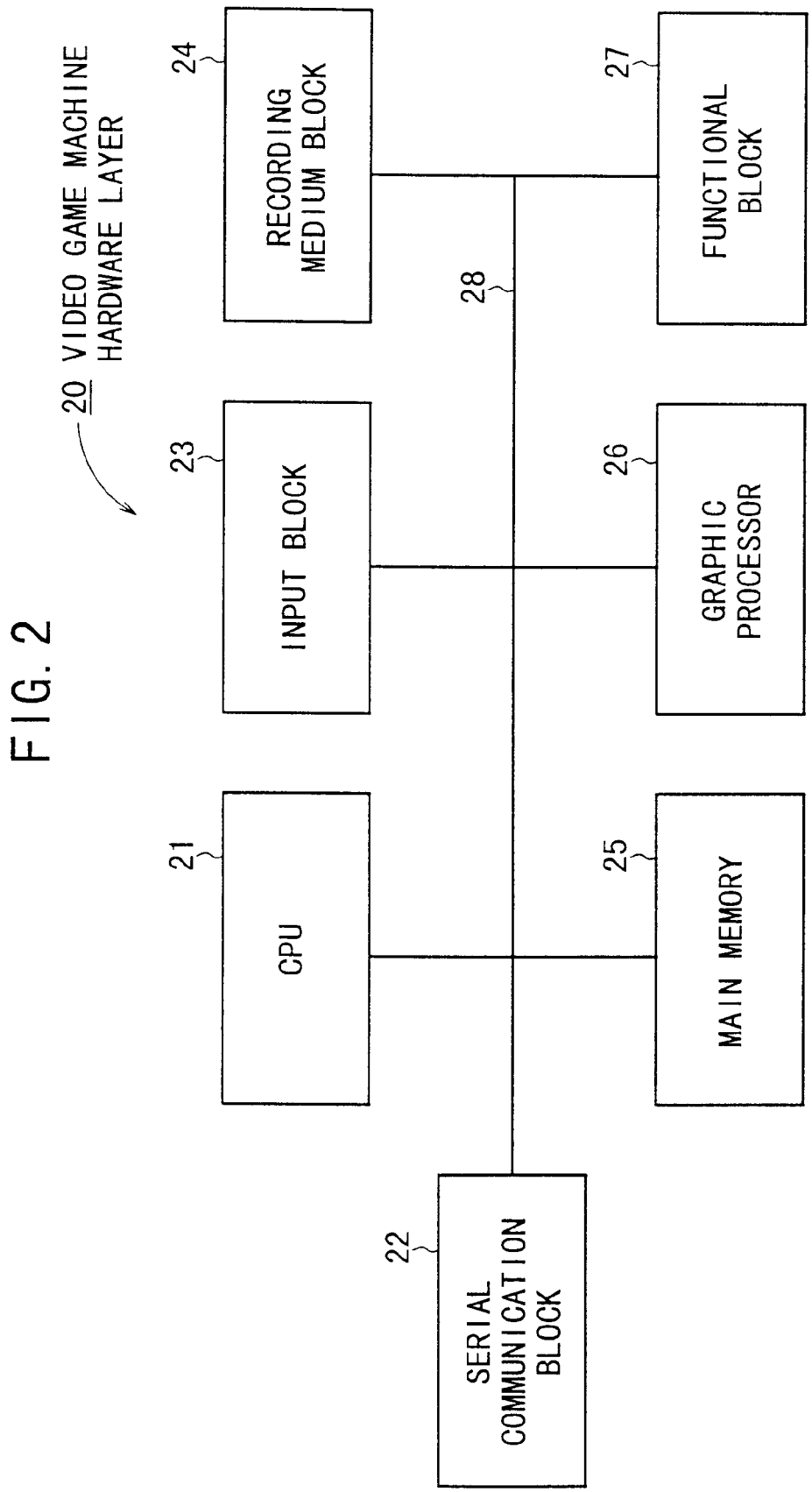
FIG. 2 is a block diagram of a video game machine hardware layer of a video game machine of the data processing system.

The video game machine 2 as a video game machine hardware layer 20 (see FIG. 2) which comprises a CPU 21 functioning as a control means for controlling the inputting and outputting of image data, a processing means for processing image data, a combining and processing means for combining and processing image data, and a data reading means for reading data such as application program data recorded in a recording medium (not shown), a serial communication block 22 as first and second connecting means to which the digital camera 4 and the portable computer 3 are connected, an input block 23 functioning as a command input means for controlling operation of the CPU 21 in response to manual input commands, a recording medium block 24, a main memory 25, a graphic processor 26, and a functional block 27. These components of the video game machine hardware layer 20 are connected to a bus 28.

The serial communication block 22 has a function to perform serial communications with an external device. The serial communication block 22 has terminals (not shown) electrically connectable to serial communication blocks 33, 42 (described later on) of the portable computer 3 and the digital camera 4, so that the video game machine 2 can send image data, etc. to and receive image data, etc. from the portable computer 3 and the digital camera 4.

The input block 23 has a function as a manual command input unit. The input block 23 allows various information to be inputted to the video game machine 2 by the user, and also enables the video game machine 2 to process and combine image data in response to commands from the user.

A recording medium (not shown) is loaded in the recording medium block 24, which has a driving mechanism for driving the recording medium. In the video game machine 2, the CPU 21 controls the recording medium block 24 to read a communication and image processing application 50 (see FIG. 5) recorded in the recording medium.

The main memory 25 is a memory means for storing various data. The main memory 25 stores application programs including the communication and image processing application 50 recorded in the recording medium (not shown), and image data supplied from the portable computer 3 or the digital camera 4 via the serial communication block 22.

The graphic processor 26 serves as a unit for processing image data that are supplied thereto. The graphic processor 26 effects graphic processing on images to be displayed on a display unit. Specifically, the graphic processor 26 performs polygon graphic processing.

The functional block 27 is arranged to perform other functions than the above blocks, and may comprise, for example, a power supply block.

The CPU 21 has a function to control the above blocks. For example, the CPU 21 controls the inputting and outputting of data supplied to the video game machine 2 via the serial communication block 22 or data outputted from the video game machine 2 via the serial communication block 22. The CPU 21 also has a function to process and combine data. The CPU 21 also transfers application programs recorded in the recording medium (not shown) to the portable computer 3 and holds the transferred application programs in the portable computer 3.

The video game machine 2 thus constructed is capable of performing a video game based on a program recorded in a recording medium such as a CD-ROM or the like. The video game machine 2 is arranged such that a nonvolatile memory card system (not shown) can removably be connected thereto.

Figure 3:
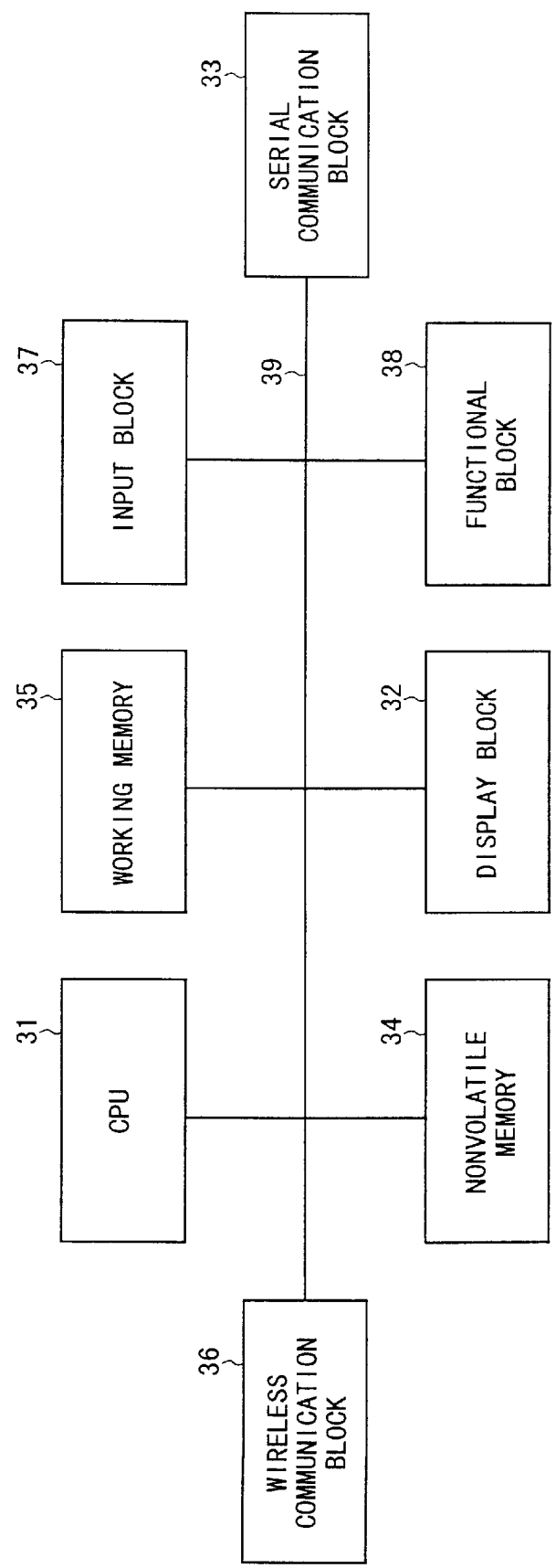
FIG. 3 is a block diagram of a PDA hardware layer of a portable computer of the data processing system.

The portable computer 3 has a PDA hardware layer 30 (see FIG. 3) which comprises a display block 32 having a function as a display means for displaying supplied image data, a CPU 31, a serial communication block 33, a nonvolatile memory 34, a working memory 35, a wireless communication block 36, an input block 37, and a functional block 38. These components of the PDA hardware layer 30 are connected to a bus 39.

The display block 32 is arranged to function as a display unit for displaying various items of information. The display block 32 displays image data and various character information on a liquid crystal panel (not shown), for example.

The serial communication block 33 has a function to effect serial communications with an external device. The serial communication block 33 is electrically connectable to the serial communication block 22 of the video game machine 2, for example, for data communications with the video game machine 2. The portable computer 3 is supplied with image data from the video game machine 2 via the serial communication block 33, and also with application programs recorded in the recording medium (not shown) loaded in the video game machine 2.

The nonvolatile memory 34 serves as a memory means for storing various data. The nonvolatile memory 34 stores image data and application programs supplied from the video game machine 2 via the serial communication block 33.

The working memory 35 serves as a memory means for use as a working area for various data. As with the nonvolatile memory 34, the working memory 35 stores image data and application programs supplied from the video game machine 2.

The radio communication block 36 has a function to communicate with an external device by way of infrared rays according to IrDA standards or microwaves.

The input block 37 is arranged to function as a manual command input unit. For example, the input block 37 allows the user to enter various items of information.

The functional block 38 is arranged to perform other functions than the above blocks, and may comprise, for example, a power supply block.

The CPU 31 has a function to control the above blocks. For example, the CPU 31 controls the blocks according to various programs of the above software layer. The CPU 31 also functions as executing means for executing program data.

The portable computer 3 can removably be connected to the video game machine 2 for sending data to and receiving data from the video game machine 2. Furthermore, the portable computer 3 is compatible with the nonvolatile memory card system (not shown) that can also removably be connected to the video game machine 2.

Figure 4:
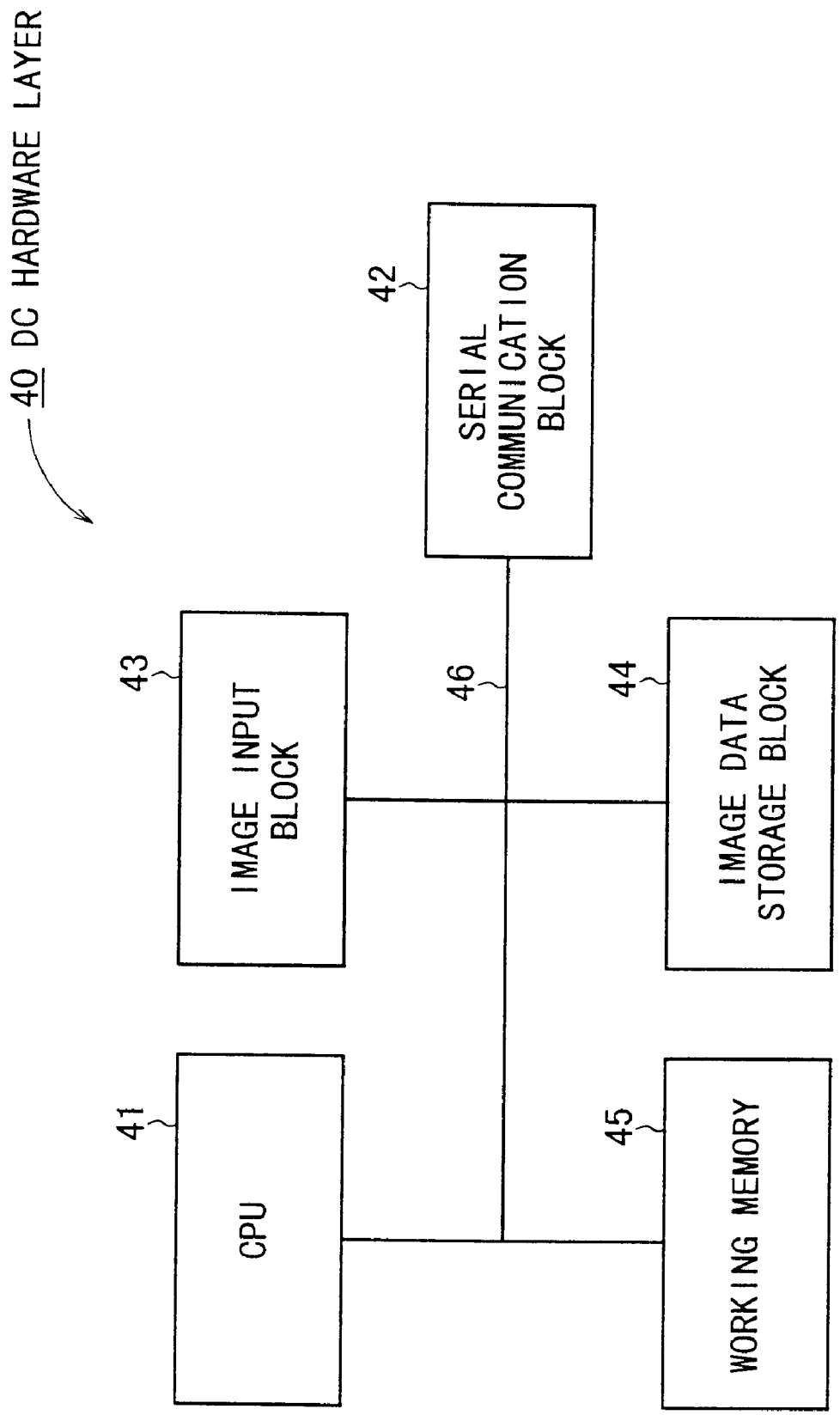
FIG. 4 is a block diagram of a DC hardware layer of a digital camera connected to the data processing system.

The digital camera 4 connected to the video game machine 2 has a DC hardware layer 40 (see FIG. 4) which comprises a CPU 41, a serial communication block 42, an image input block 43, an image data storage block 44, and a working memory 45. These components of the DC hardware layer 40 are connected to a bus 46.

The serial communication block 42 has a function to effect serial communications with an external device. The serial communication block 42 is electrically connectable to the serial communication block 22 of the video game machine 2 for sending data to and receiving data from the video game machine 2. The digital camera 4 is supplied with image data from the video game machine 2 via the serial communication block 42, and supplies image data to the video game machine 2 via the serial communication block 42.

The image input block 43 is arranged to have a function as an image capturing unit, and has an optical system including lenses, a shutter, etc. The data of an image captured by the image input block 43 is recorded as multicolor, high-resolution image data in the image data storage block 44.

The image data storage block 44 is arranged as a component for recording captured images. The image data storage block 44 has a built-in nonvolatile memory or comprises a removable recording medium. The image data storage block 44 stores the data of captured images and image data supplied from the video game machine 2 via the serial communication block 42.

The working memory 45 serves as a memory means for use as a working area for various data. As with the image data storage block 44, the working memory 45 stores captured image data and image data supplied from the video game machine 2.

The CPU 41 has a function to control the above blocks. For example, the CPU 41 controls the blocks according to various programs of the above software layer.

Figure 5:
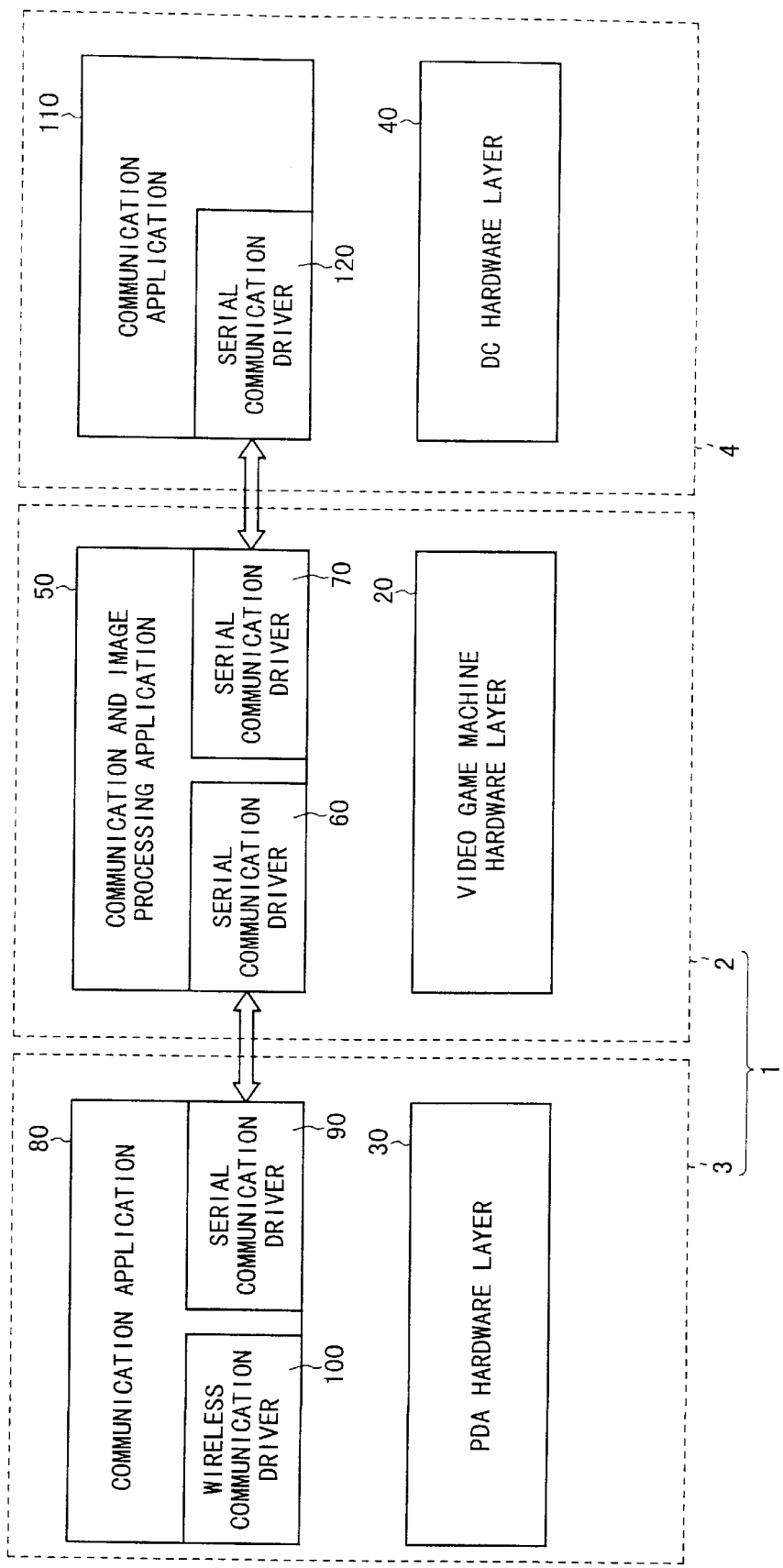
FIG. 5 is a block diagrams of hardware layers and software layers of the data processing system and the digital camera.

The data processing system 1 with the portable computer 3 connected to the video game machine 2, and the digital camera 4 connected to the video game machine 2 have a logical relationship as shown in FIG. 5. The video game machine 2 has the video game machine hardware layer 20 as its hardware layer, and also has a software layer comprising a communication and image processing application 50 for performing communications with the portable computer 3 and the digital camera 4 and processing image data, and serial communication drivers 60, 70 for performing serial communications with the portable computer 3 and the digital camera 4, these applications and communication drivers being read from the recording medium (not shown) loaded in the recording medium block 24 by the CPU 21. The serial communication block 22 sends and receives data according to the serial communication drivers 60, 70. The portable computer 3 has the PDA hardware layer 30 as its hardware layer, and also has a software layer comprising a communication application 80 for performing communications with the video game machine 2, a serial communication driver 90, and a wireless communication driver 100. The serial communication block 33 and the wireless communication block 36 send and receive data according to the serial communication driver 90 and the wireless communication driver 100.

The digital camera 4 which sends data to and receives data from the data processing system 1 has the DC hardware layer 40 as its hardware layer, and also has a software layer comprising a communication application 110 for performing communications with the video game machine 2, and a serial communication driver 120. The serial communication block 42 sends and receives data according to the serial communication driver 120.

Figure 6:
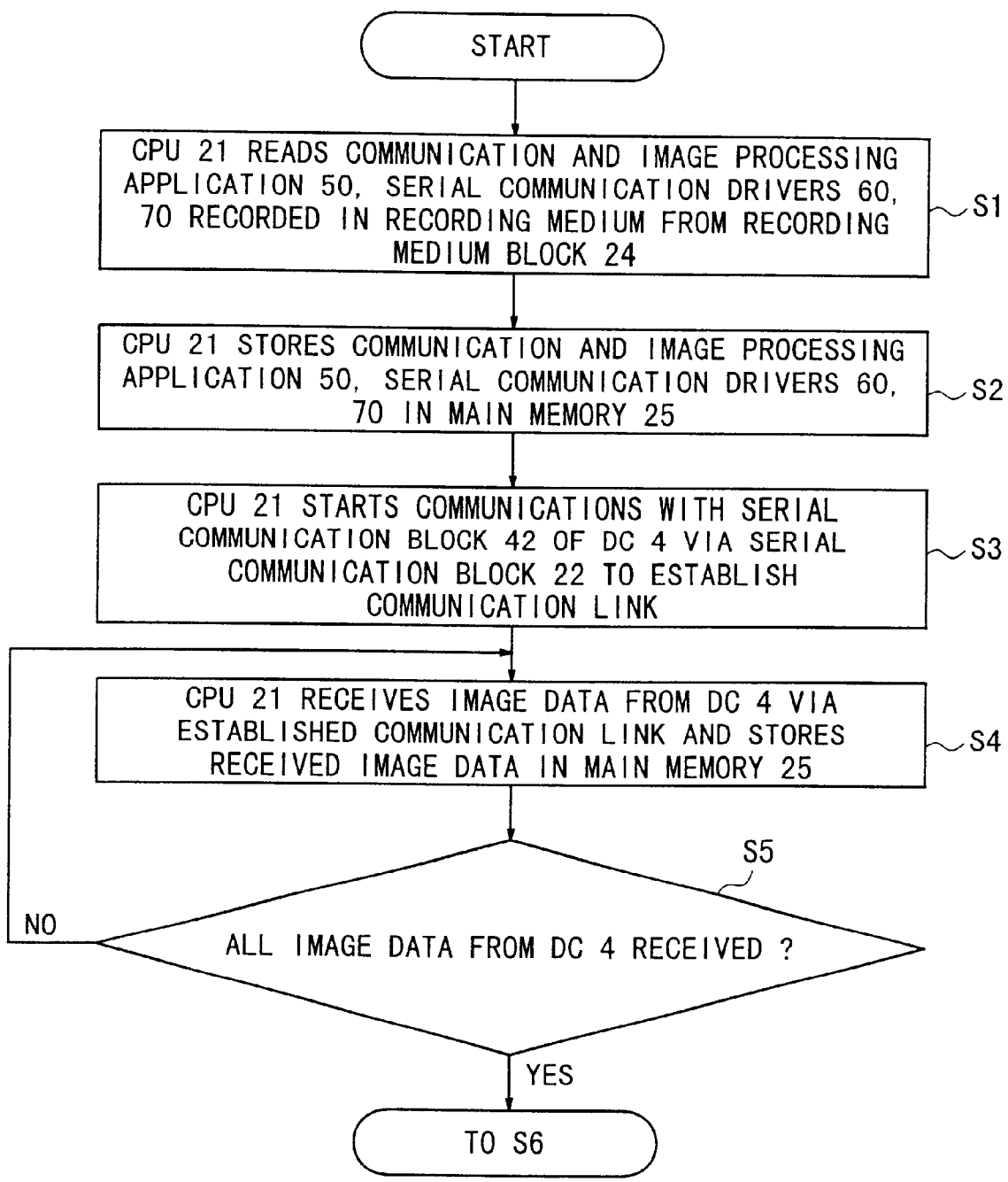
FIG. 6 is a flowchart of a processing sequence of the video game machine in a process of supplying image data from the digital camera to the video game machine.

In the data processing system 1 of the above structure, the video game machine 2 receives image data, i.e., multicolor, high-resolution image data, from the digital camera 4 according to a processing sequence shown in FIG. 6.

The CPU 21 of the video game machine 2 reads the communication and image processing application 50 and the serial communication drivers 60, 70 for performing serial communications with the portable computer 3 and the digital camera 4, which are recorded in the recording medium (not shown), from the recording medium block 24, in step S1 shown in FIG. 6.

Then, the CPU 21 stores the communication and image processing application 50 and the serial communication drivers 60, 70 in the main memory 25 in step S2.

Thereafter, the CPU 21 starts communications with the serial communication block 42 of the digital camera 4 via the serial communication block 22 to establish a communication link therewith in step S3. Thereafter, the CPU 21 receives multicolor, high-resolution image data from the digital camera 4 via the established communication link, and stores the received image data in the main memory in step S4.

To confirm the end of the reception of the image data from the digital camera 4, the CPU 21 decides whether all if the image data has been received from the digital camera 4 or not in step S5. If the CPU 21 confirms that all the image data has been received, then the video game machine 2 finishes the process of receiving the image data. If the CPU 21 confirms that all the image data has not been received, then the video game machine 2 executes the processing from step S4 again.

Figure 7:
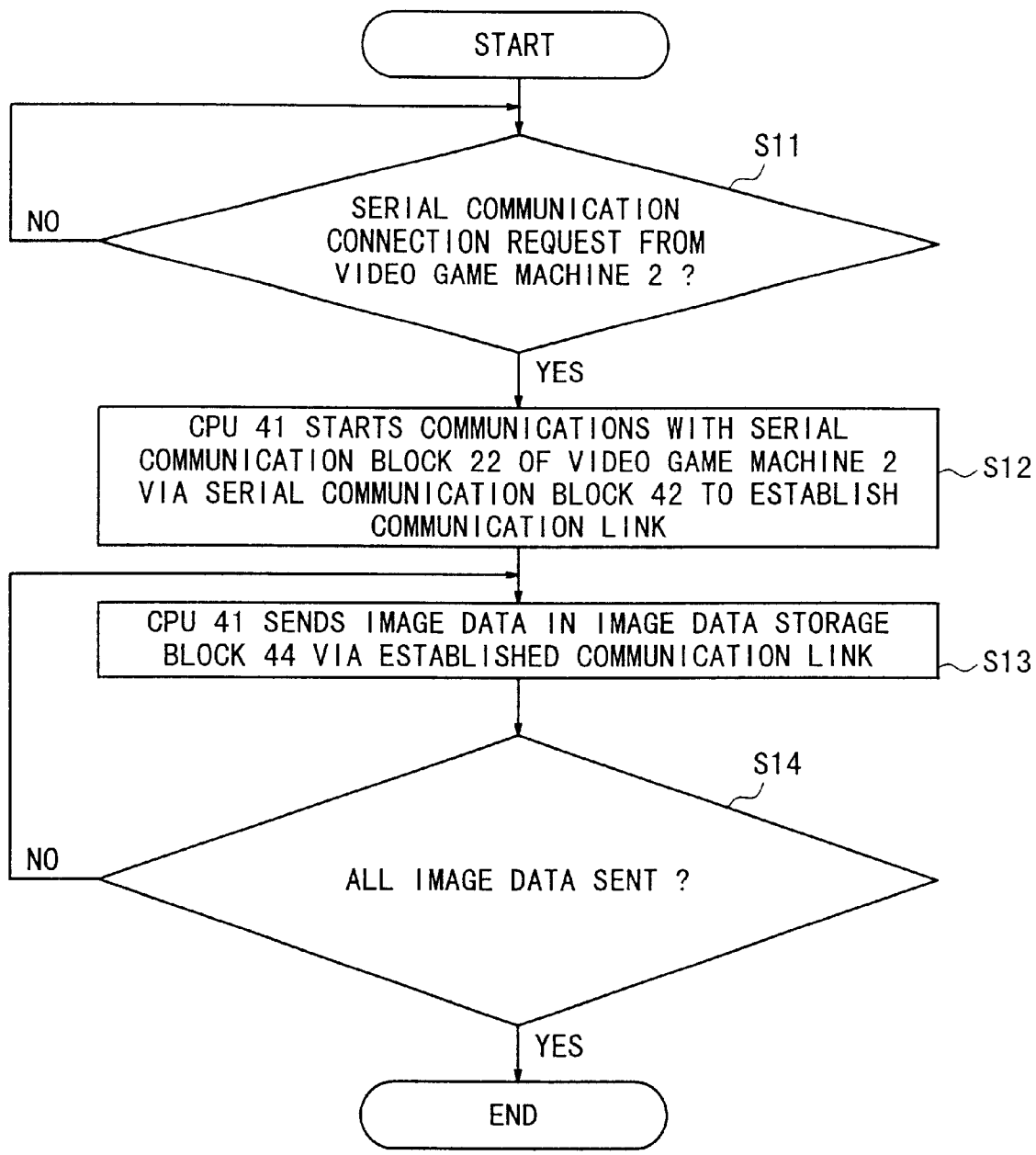
FIG. 7 is a flowchart of a processing sequence of the digital camera in the process of supplying image data from the digital camera to the video game machine.

Concurrent with the above process carried out by the video game machine 2, the digital camera 4 decides whether there is a serial communication connection request from the video game machine 2 or not in step S11 shown in FIG. 7.

If the digital camera 4 confirms that there is a serial communication connection request from the video game machine 2 in step S11, then the CPU 41 of the digital camera 4 starts communications with the serial communication block 22 of the video game machine 2 via the serial communication block 42 to establish a communication link therewith in step S12.

Then, the CPU 41 sends multicolor, high-resolution image data stored in the image data storage block 44 to the video game machine 2 via the established communication link in step S13.

The processing in steps S12, S13 performed by the digital camera 4 corresponds to the processing in steps S3, S4 performed by the video game machine 2.

To confirm the end of the transmission of the image data, the CPU 41 decides whether all the image data has been sent to the video game machine 2 or not in step S14. If the CPU 41 confirms that all the image data has been sent to the video game machine 2, then the digital camera 4 finishes the process of sending the image data. If the CPU 41 confirms that all the image data has not been sent to the video game machine 2, then the digital camera 4 executes the processing from step S13 again.

The above processing sequences of the video game machine 2 and the digital camera 4 allow the digital camera 4 to supply the multicolor, high-resolution image data to the video game machine 2.

A process, performed by the video game machine 2, of processing the multicolor, high-resolution image data received from the digital camera 4 and sending the processed image data to the portable computer 3 will be described below with reference to FIGS. 8 and 9.

Figure 8:
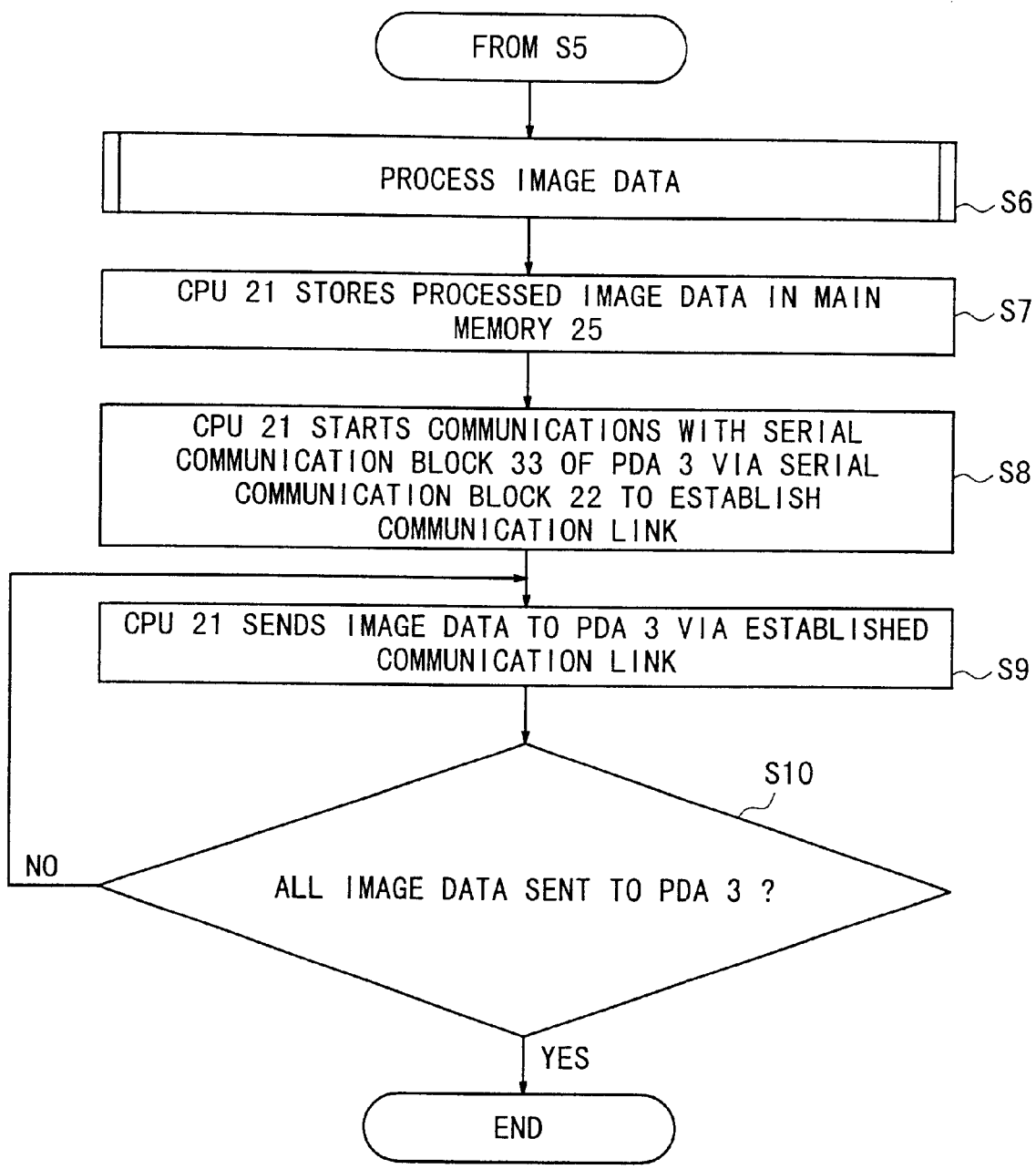
FIG. 8 is a flowchart of a processing sequence of the video game machine in a process of processing image data in the video game machine and supplying the processed image data to the portable computer.

The video game machine 2 processes the multicolor, high-resolution image data supplied from the digital camera 4 in step S6 shown in FIG. 8. The multicolor, high-resolution image data is processed by the communication and image processing application 50 for resolution conversion, color reduction, trimming, scaling-up, scaling-down, axis reversal, color reversal, etc., as described later on, in order to generate fewer-color, low-resolution image data that can be used by the portable computer 3.

Then, the CPU 21 of the video game machine 2 stores the image data processed in step S6 in the main memory 25 in step S7.

Thereafter, the CPU 21 starts communications with the serial communication block 33 of the portable computer 3 via the serial communication block 22 to establish a communication link therewith in step S8.

Then, the CPU 21 sends the processed data to the portable computer 3 via the established communication link in step S9.

To confirm the end of the transmission of the image data, the CPU 21 decides whether all the image data has been sent or not in step S10. If the CPU 21 confirms that all the image data has been sent, then the video game machine 2 finishes the process of sending the image data. If the CPU 21 confirms that all the image data has not been sent, then the video game machine 2 executes the processing from step S9 again.

Figure 9:
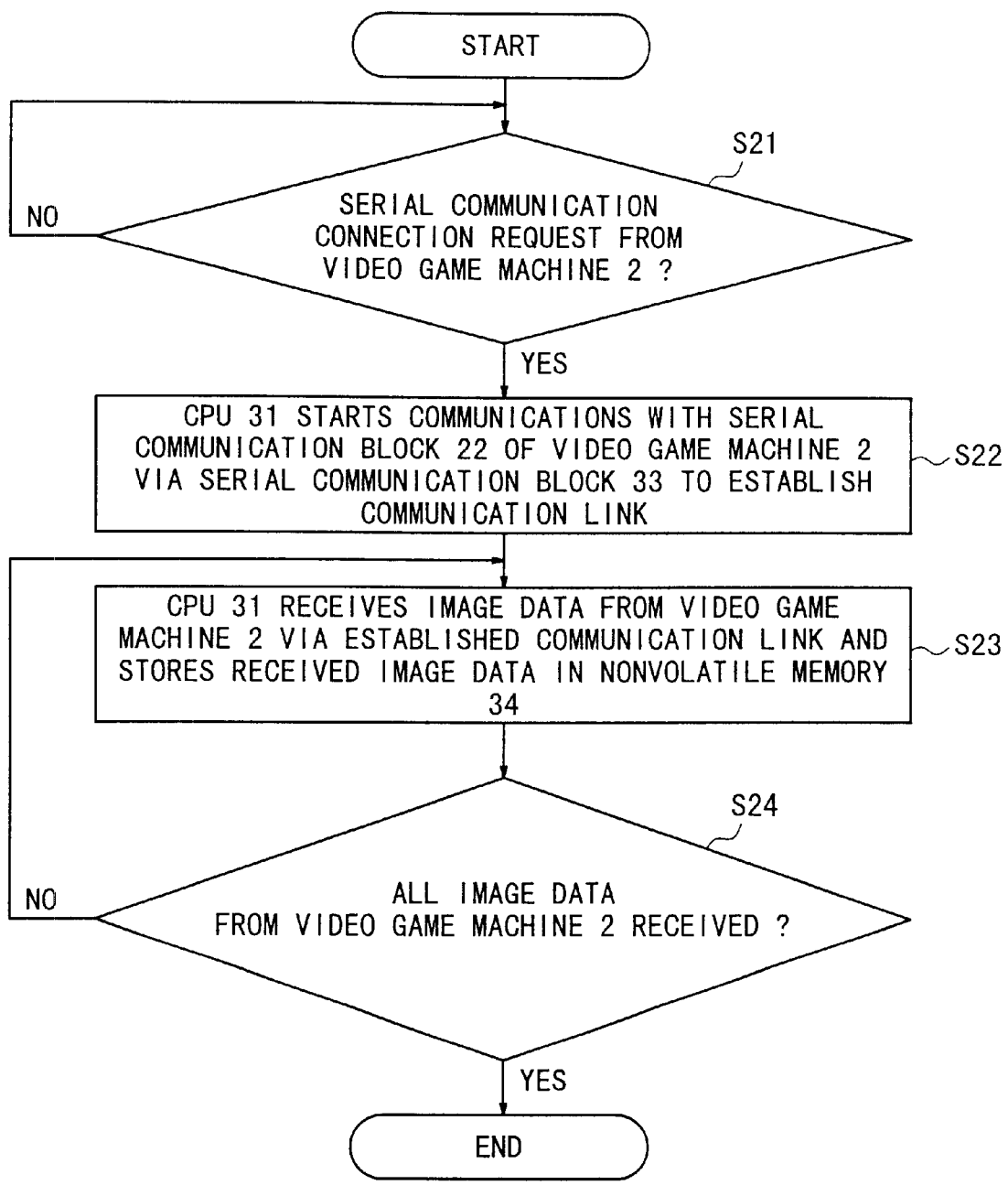
FIG. 9 is a flowchart of a processing sequence of the portable computer in the process of processing image data in the video game machine and supplying the processed image data to the portable computer.

Concurrent with the above process carried out by the video game machine 2, the portable computer 3 decides whether there is a serial communication connection request from the video game machine 2 or not in step S21 shown in FIG. 9.

If the portable computer 3 confirms that there is a serial communication connection request from the video game machine 2 in step S21, then the CPU 31 of the portable computer 3 starts communications with the serial communication block 22 of the video game machine 2 via the serial communication block 33 to establish a communication link therewith in step S22.

Then, the CPU 31 stores the image data received from the video game machine 2 in the nonvolatile memory 34 via the established communication link in step S23.

The processing in steps S22, S23 performed by the portable computer 3 corresponds to the processing in steps S8, S9 performed by the video game machine 2.

To confirm the end of the reception of the image data from the video game machine 2, the CPU 31 decides whether all the image data has been received or not in step S24. If the CPU 31 confirms that all the image data has been received, then the portable computer 3 finishes the process of receiving the image data. If the CPU 31 confirms that all the image data has not been received, then the portable computer 3 executes the processing from step S23 again.

The above processing sequences allow the video game machine 2 to process the image data from the digital camera 4 into fewer-color, low-resolution image data that can be used by the portable computer 3, and supply the fewer-color, low-resolution image data to the portable computer 3.

Therefore, the data processing system 1 can use the digital camera 4 as an image input device and the portable computer 3 as an image output device with respect to the video game machine 2. Since the resolution, etc. of the supplied image data has been processed so as to be displayable on the display block 32, the portable computer 3 can display the supplied image data, and can execute application programs which use the supplied image data.

A process of supplying a plurality of image data from the digital camera 4 to the video game machine 2, combining the image data for superposition or simultaneous display on one screen with the video game machine 2, and supplying the combined image data to the portable computer 3 will be described below with reference to FIGS. 10 through 13.

Figure 10:
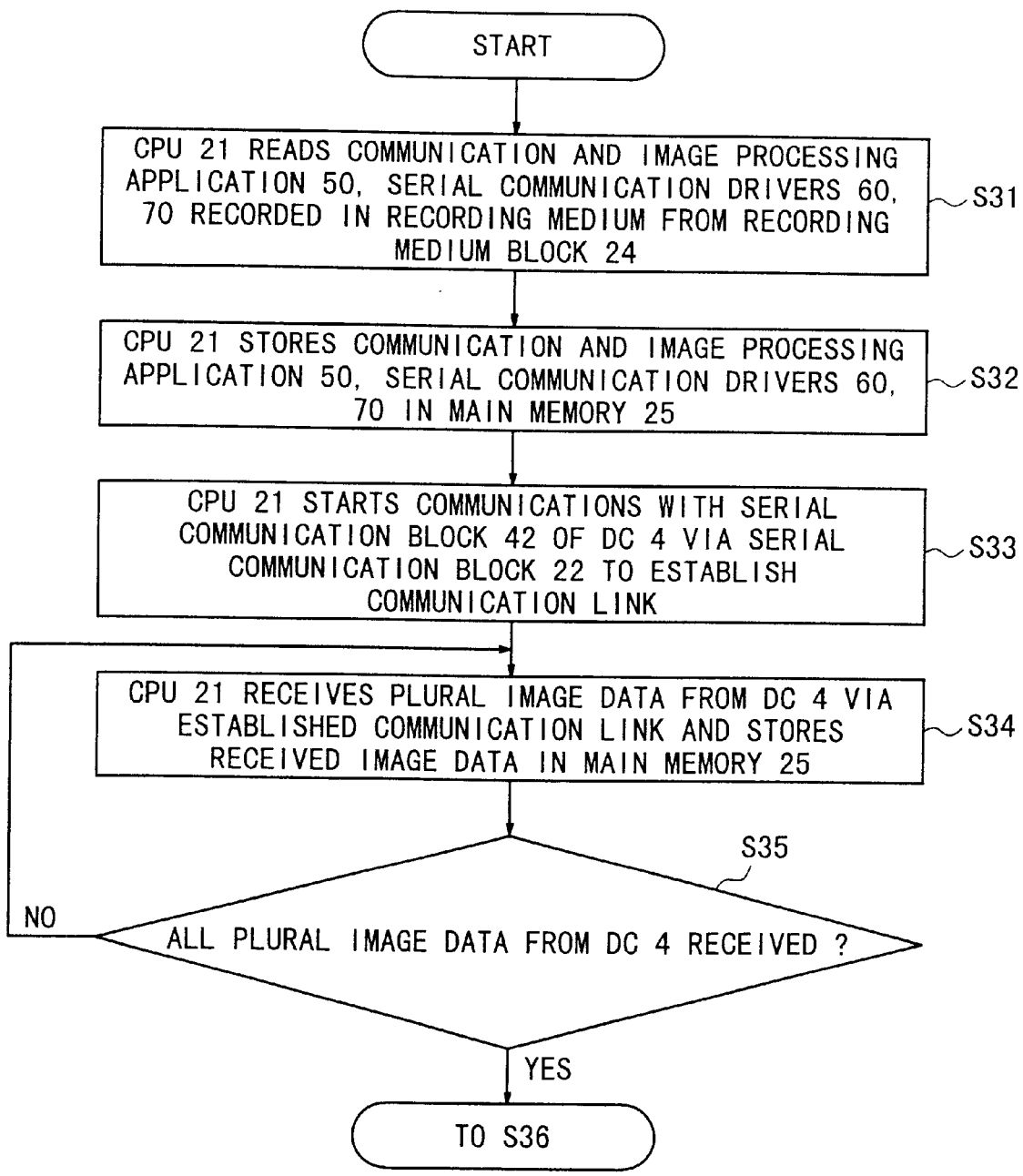
FIG. 10 is a flowchart of a processing sequence of the video game machine in a process of supplying a plurality of image data from the digital camera to the video game machine.

The CPU 21 of the video game machine 2 reads the communication and image processing application 50 and the serial communication drivers 60, 70 for performing serial communications with the portable computer 3 and the digital camera 4, which are recorded in the recording medium (not shown), from the recording medium block 24, in step S31 shown in FIG. 10.

Then, the CPU 21 stores the communication and image processing application 50 and the serial communication drivers 60, 70 in the main memory 25 in step S32.

Thereafter, the CPU 21 starts communications with the serial communication block 42 of the digital camera 4 via the serial communication block 22 to establish a communication link therewith in step S33. Thereafter, the CPU 21 receives a plurality of multicolor, high-resolution image data from the digital camera 4 via the established communication link, and stores the received image data in the main memory in step S34.

To confirm the end of the reception of the plural image data from the digital camera 4, the CPU 21 decides whether all the plural image data have been received from the digital camera 4 or not in step S35. If the CPU 21 confirms that all the plural image data have been received, then the video game machine 2 finishes the process of receiving the image data, and control goes to step S36 shown in FIG. 11. If the CPU 21 confirms that all the plural image data have not been received, then the video game machine 2 executes the processing from step S34 again.

Figure 11:
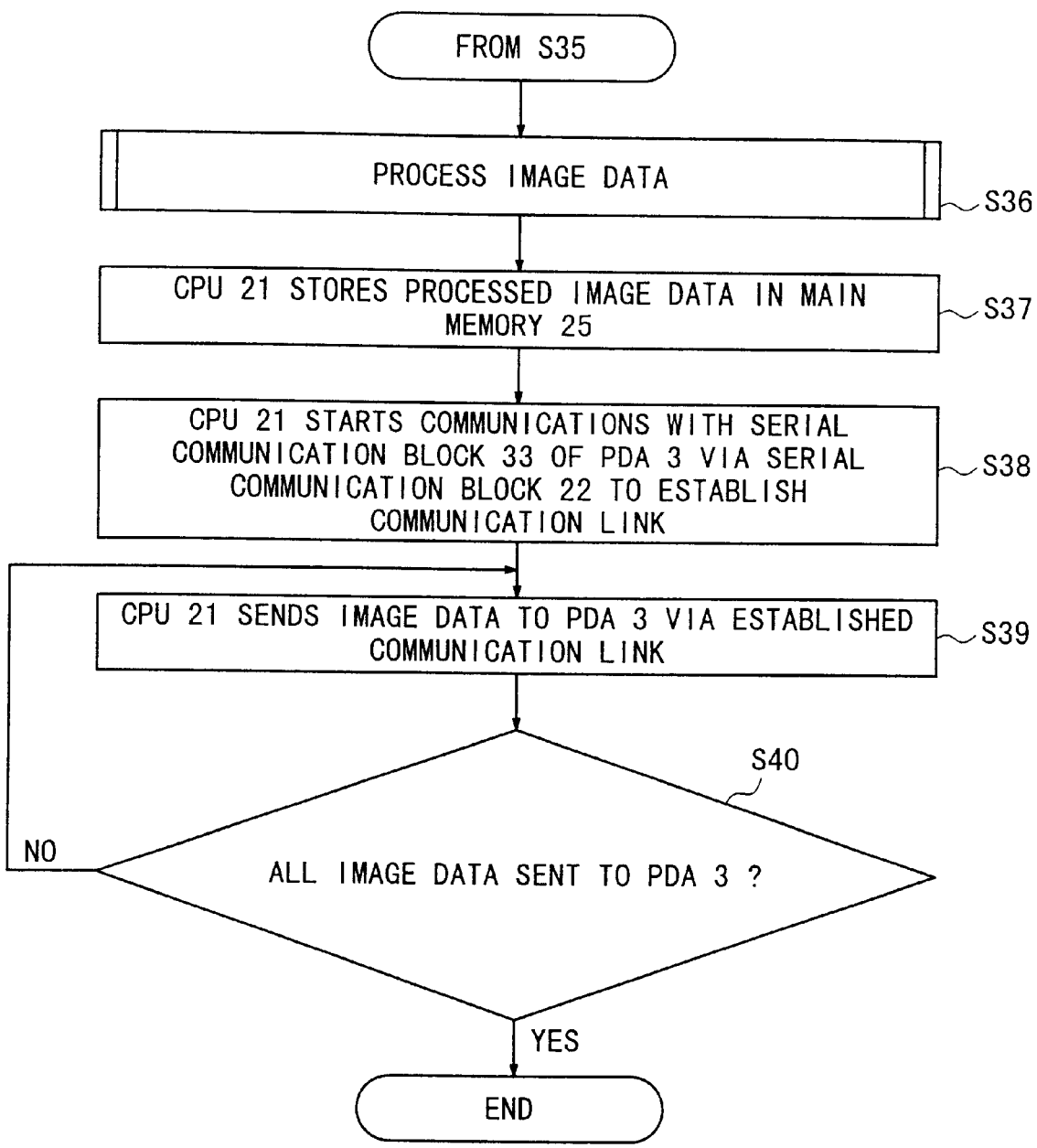
FIG. 11 is a flowchart of a processing sequence of the video game machine in a process of combining a plurality of image data in the video game machine and supplying the combined image data to the portable computer.

The video game machine 2 combines the plurality of multicolor, high-resolution image data supplied from the digital camera 4 in step S36 shown in FIG. 11. In step S36, the image data are combined for superposition or simultaneous display on one screen as described above. The image data processing described above may also be carried out in step S36.

Then, the CPU 21 stores the image data combined in step S6 in the main memory 25 in step S37.

Thereafter, the CPU 21 starts communications with the serial communication block 33 of the portable computer 3 via the serial communication block 22 to establish a communication link therewith in step S38.

Thereafter, the CPU 21 transmits the combined image data to the portable computer 3 via the established communication link in step S39.

To confirm the end of the transmission of the image data, the CPU 21 decides whether all the image data has been sent or not in step S40. If the CPU 21 confirms that all the image data has been sent, then the video game machine 2 finishes the process of sending the image data. If the CPU 21 confirms that all the image data has not been sent, then the video game machine 2 executes the processing from step S39 again.

Figure 12:
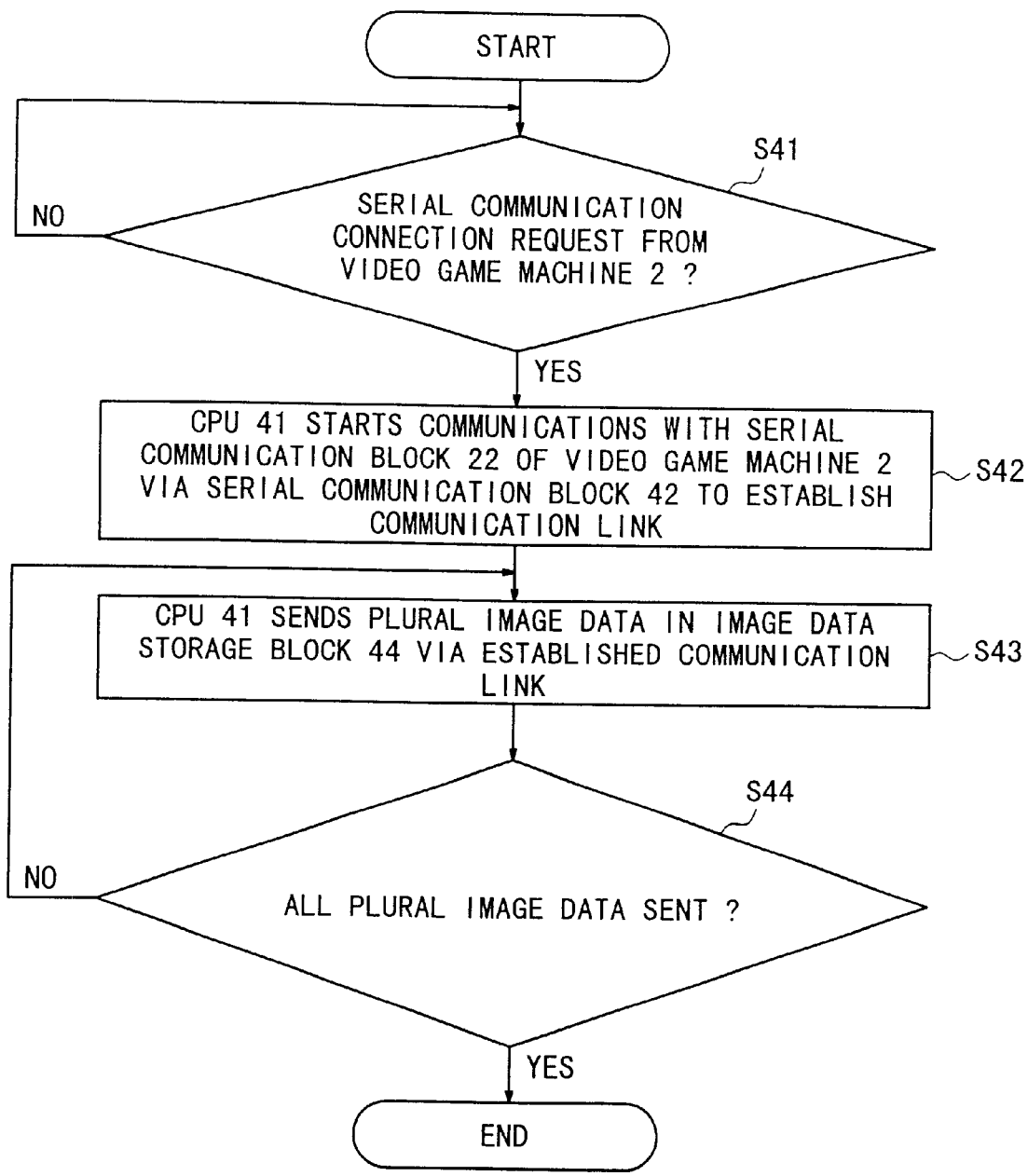
FIG. 12 is a flowchart of a processing sequence of the digital camera in the process of supplying a plurality of is image data from the digital camera to the video game machine.

Concurrent with the above process carried out by the video game machine 2, the digital camera 4 decides whether there is a serial communication connection request from the video game machine 2 or not in step S41 shown in FIG. 12.

If the digital camera 4 confirms that there is a serial communication connection request from the video game machine 2 in step S41, then the CPU 41 of the digital camera 4 starts communications with the serial communication block 22 of the video game machine 2 via the serial communication block 42 to establish a communication link therewith in step S42.

Then, the CPU 41 sends a plurality of multicolor, high-resolution image data stored in the image data storage block 44 to the video game machine 2 via the established communication link in step S43.

The processing in steps S42, S43 performed by the digital camera 4 corresponds to the processing in steps S33, S34 performed by the video game machine 2.

To confirm the end of the transmission of the plural image data, the CPU 41 decides whether all the plural image data have been sent to the video game machine 2 or not in step S44. If the CPU 41 confirms that all the plural image data have been sent to the video game machine 2, then the digital camera 4 finishes the process of sending the plural image data. If the CPU 41 confirms that all the plural image data have not been sent to the video game machine 2, then the digital camera 4 executes the processing from step S43 again.

Figure 13:
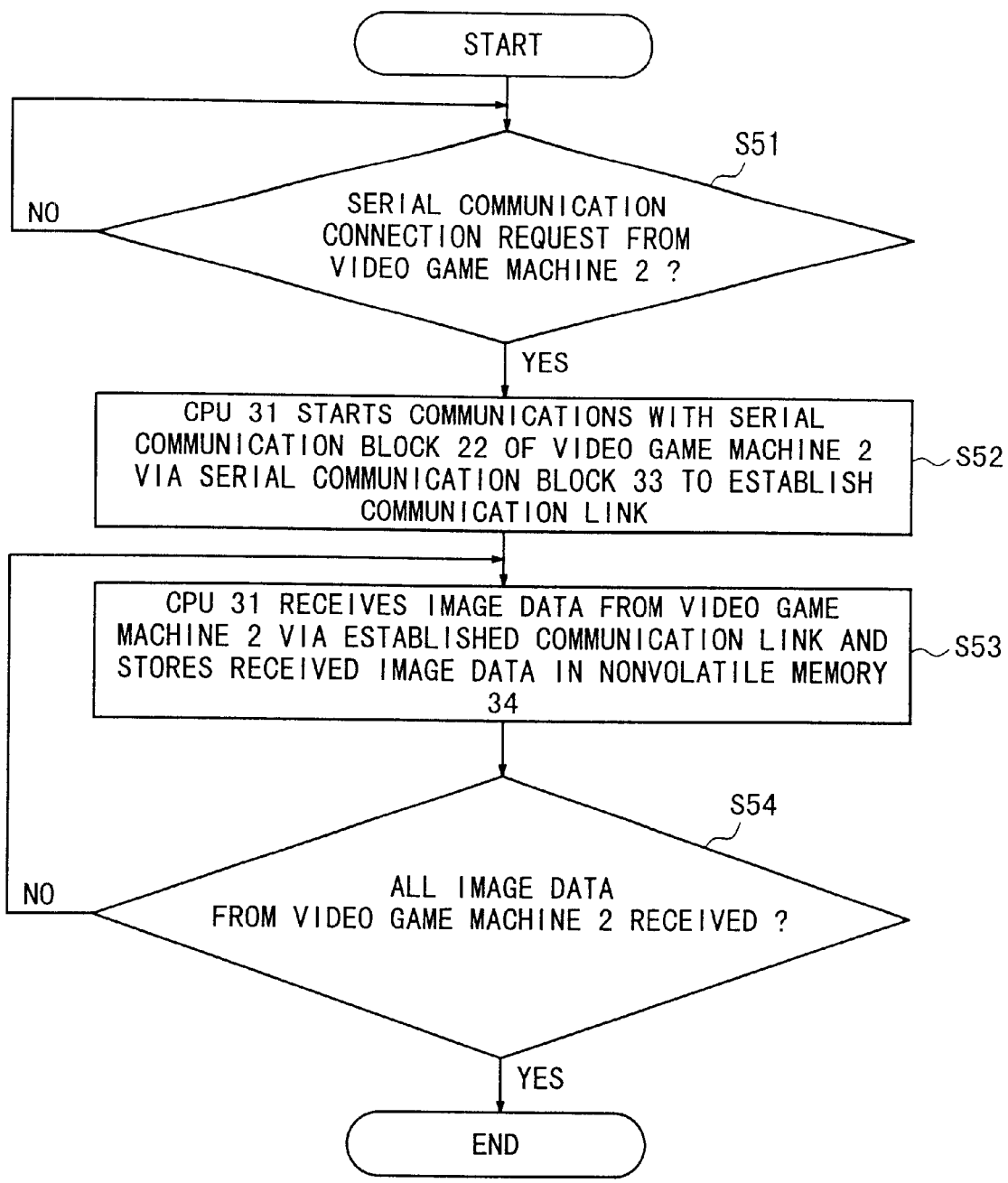
FIG. 13 is a flowchart of a processing sequence of the portable computer in the process of combining a plurality of image data in the video game machine and supplying the combined image data to the portable computer.

The portable computer 3 decides whether there is a serial communication connection request from the video game machine 2 or not in step S51 shown in FIG. 13.

If the portable computer 3 confirms that there is a serial communication connection request from the video game machine 2 in step S51, then the CPU 31 of the portable computer 3 starts communications with the serial communication block 22 of the video game machine 2 via the serial communication block 33 to establish a communication link therewith in step S52.

Then, the CPU 31 stores the image data received from the video game machine 2 in the nonvolatile memory 34 via the established communication link in step S53.

The processing in steps S52, S53 performed by the portable computer 3 corresponds to the processing in steps S38, S39 performed by the video game machine 2.

To confirm the end of the reception of the image data from the video game machine 2, the CPU 31 decides whether all the image data has been received or not in step S54. If the CPU 31 confirms that all the image data has been received, then the portable computer 3 finishes the process of receiving the image data. If the CPU 31 confirms that all the image data has not been received, then the portable computer 3 executes the processing from step S53 again.

The above processing sequences allow the video game machine 2 to process the image data supplied from the digital camera 4 to the video game machine 2, and supply the processed image data to the portable computer 3. Therefore, when the data processing system 1 is supplied with a plurality of image data from the digital camera 4, the data processing system 1 can display the supplied plural image data on the display block 32 of the portable computer 3.

The video game machine 2 can process and combine image data according to the communication and image processing application 50 while in a variable mode in response to manually entered commands from the input block 23, and display the processed image data in a real-time fashion on the video monitor 5. A process of variably processing and combining image data will be described below with reference to FIG. 14. The process shown in FIG. 14 is directed to selective processing of the image data supplied from the digital camera 4 for resolution conversion, color reduction, and trimming, and other image data processing modes are omitted from the process shown in FIG. 14.

Figure 14:
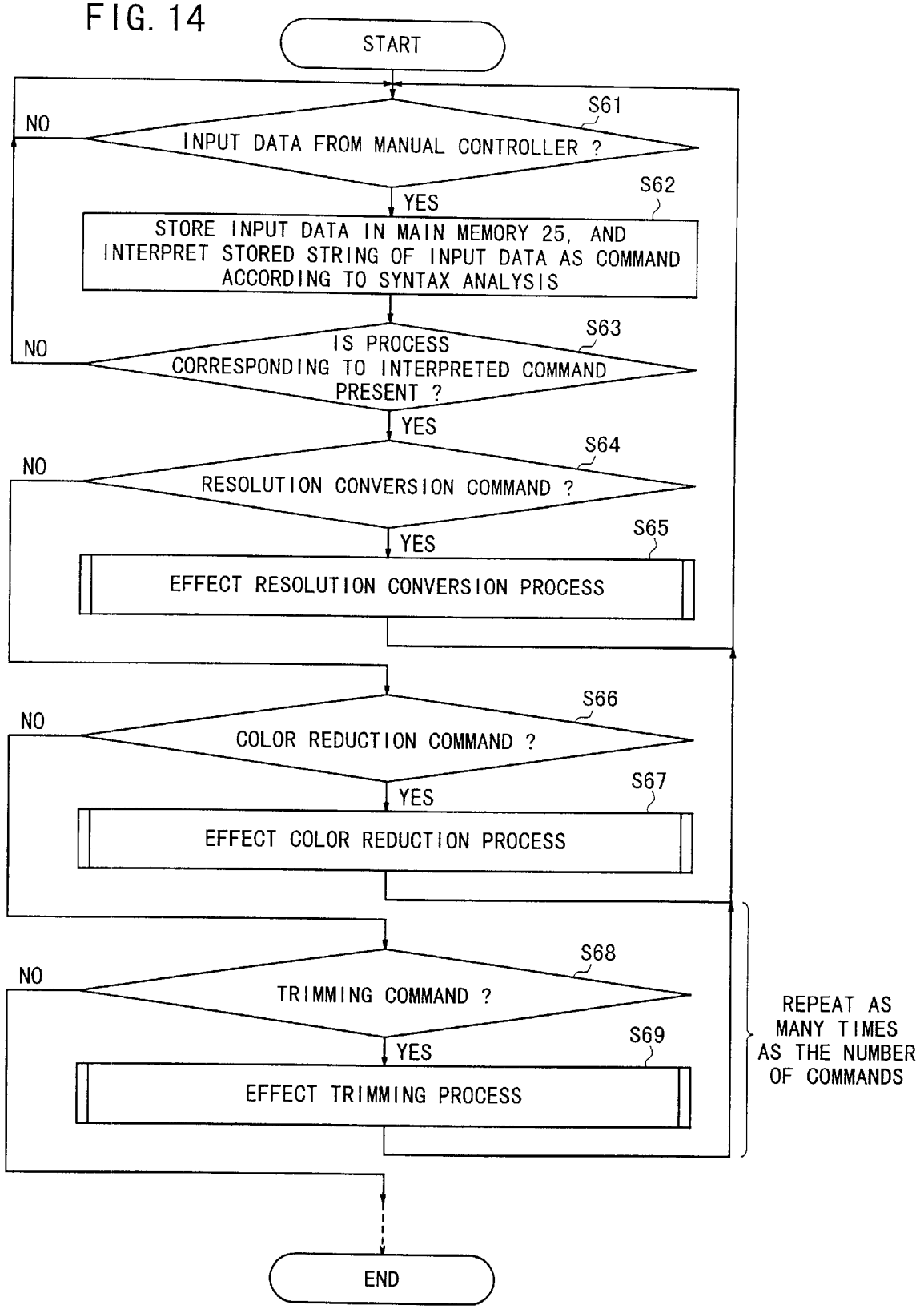
FIG. 14 is a flowchart of a processing sequence of a process of processing and combining image data supplied from the digital camera to the video game machine, variably in response to manually entered commands.

The video game machine 2 decides whether there is input data from the manual controller of the input block 23 or not in step S61 shown in FIG. 14.

If the video game machine 2 confirms that there is input data from the manual controller in step S61, then the CPU 21 stores the input data in the main memory 25, and interprets the stored string of input data as a command according to a syntax analysis in step S62.

The video game machine 2 decides in step S63 whether a processing and combining process corresponding to the command interpreted in step S62 is present in the communication and image processing application 50 and can be executed or not. If there is a processing and combining process corresponding to the command, then control goes to step S64. If there is not a processing and combining process corresponding to the command, then the video game machine 2 executes the processing from step S61 again.

The video game machine 2 decides whether the interpreted command is a resolution conversion command or not in step S64. If the interpreted command is a resolution conversion command, then the video game machine 2 performs a resolution conversion process in step S65 to convert the resolution of the image data to a resolution that can be used by the portable computer 3. If the interpreted command is not a resolution conversion command, then the video game machine 2 decides whether the interpreted command is a color reduction command or not in step S66. If the interpreted command is a color reduction command, then the video game machine 2 performs a color reduction process in step S67 to reduce the number of colors so that the image data can be used by the portable computer 3. If the interpreted command is not a color reduction command, then the video game machine 2 decides whether the interpreted command is a trimming command or not in step S68. If the interpreted command is a trimming command, then the video game machine 2 performs a trimming process in step S69. If the interpreted command is not a trimming command, then control goes to other processes including a scaling-up process, a scaling-down process, etc., after which the process of variably processing and combining image data is finished.

As described above, the data processing system 1 allows image data to be processed and combined by the video game machine 2 variably in response to manually entered commands from the user. The image data thus processed and combined can be displayed in a real-time fashion on the video monitor 5 connected to the video game machine 2. In the data processing system 1, after it is confirmed that the image data from the digital camera 4 has been processed and combined by the video game machine 2 into image data that satisfies the need of the user, the processed and combined image data can be supplied to the portable computer 3.

The data processing system 1 is capable of sending not only image data from the digital camera 4 via the video game machine 2 to the portable computer 3, but also image data from the portable computer 3 via the video game machine 2 to the digital camera 4. Such a process will be described below with reference to FIGS. 15 through 18.

Figure 15:
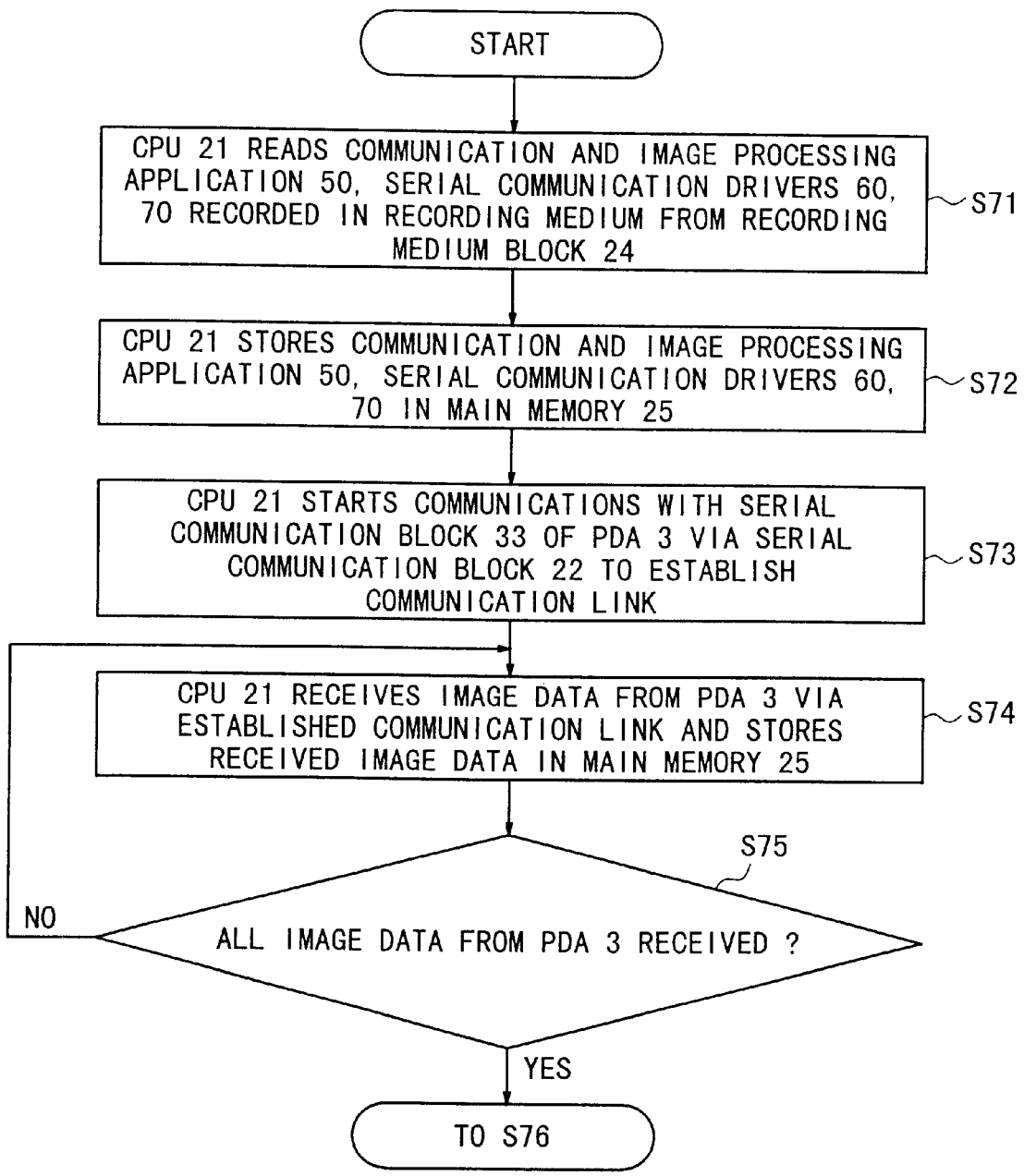
FIG. 15 is a flowchart of a processing sequence of the video game machine in a process of supplying image data from the portable computer to the video game machine.

The CPU 21 of the video game machine 2 reads the communication and image processing application 50 and the serial communication drivers 60, 70 for performing serial communications with the portable computer 3 and the digital camera 4, which are recorded in the recording medium (not shown), from the recording medium block 24, in step S71 shown in FIG. 15.

Then, the CPU 21 stores the communication and image processing application 50 and the serial communication drivers 60, 70 in the main memory 25 in step S72.

Thereafter, the CPU 21 starts communications with the serial communication block 33 of the portable computer 3 via the serial communication block 22 to establish a communication link therewith in step S73.

Thereafter, the CPU 21 receives image data from the portable computer 3 via the established communication link, and stores the received image data in the main memory 25 in step S74.

To confirm the end of the reception of the image data from the portable computer 3, the CPU 21 decides whether all the image data has been received from the portable computer 3 or not in step S75. If the CPU 21 confirms that all the image data has been received, then the video game machine 2 finishes the process of receiving the image data. If the CPU 21 confirms that all the image data has not been received, then the video game machine 2 executes the processing from step S74 again.

Figure 16:
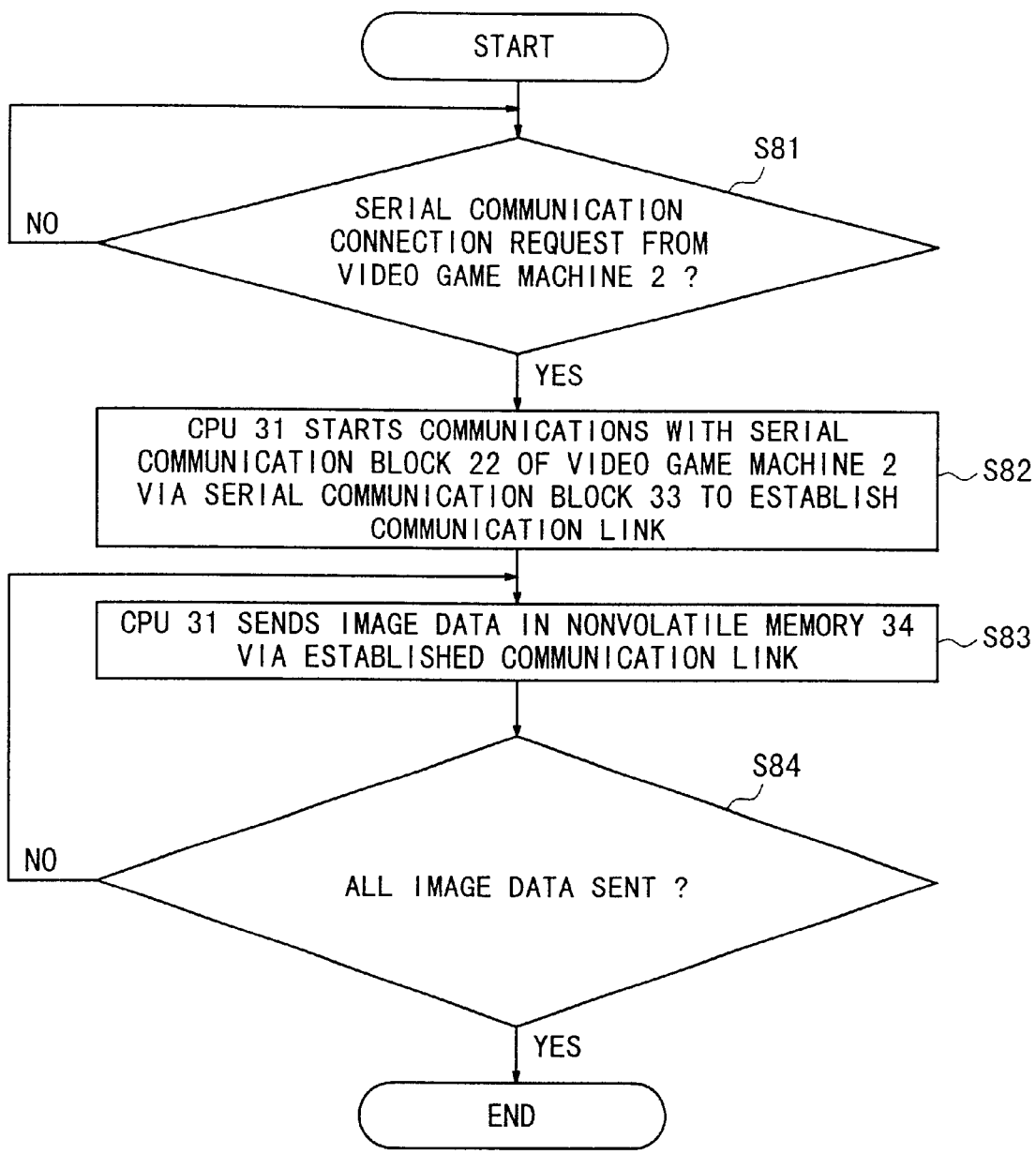
FIG. 16 is a flowchart of a processing sequence of the portable computer in the process of supplying image data from the portable computer to the video game machine.

Concurrent with the above process carried out by the video game machine 2, the portable computer 3 decides whether there is a serial communication connection request from the video game machine 2 or not in step S81 shown in FIG. 16.

If the portable computer 3 confirms that there is a serial communication connection request from the video game machine 2 in step S81, then the CPU 31 of the portable computer 3 starts communications with the serial communication block 22 of the video game machine 2 via the serial communication block 33 to establish a communication link therewith in step S82.

Then, the CPU 31 sends image data stored in the non-volatile memory 34 to the video game machine 2 via the established communication link in step S83.

The processing in steps S82, S83 performed by the portable computer 3 corresponds to the processing in steps S73, S74 performed by the video game machine 2.

To confirm the end of the transmission of the image data, the CPU 31 decides whether all the image data has been sent or not in step S84. If the CPU 31 confirms that all the image data has been sent, then the portable computer 3 finishes the process of sending the image data. If the CPU 31 confirms that all the image data has not been sent, then the portable computer 3 executes the processing from step S83 again.

The above processing sequences of the video game machine 2 and the portable computer 3 allow the portable computer 3 to supply image data to the video game machine 2 in the data processing system 1.

A process, performed by the video game machine 2, of processing the image data received from the portable computer 3 and sending the processed image data to the digital camera 4 will be described below with reference to FIGS. 17 and 18.

Figure 17:
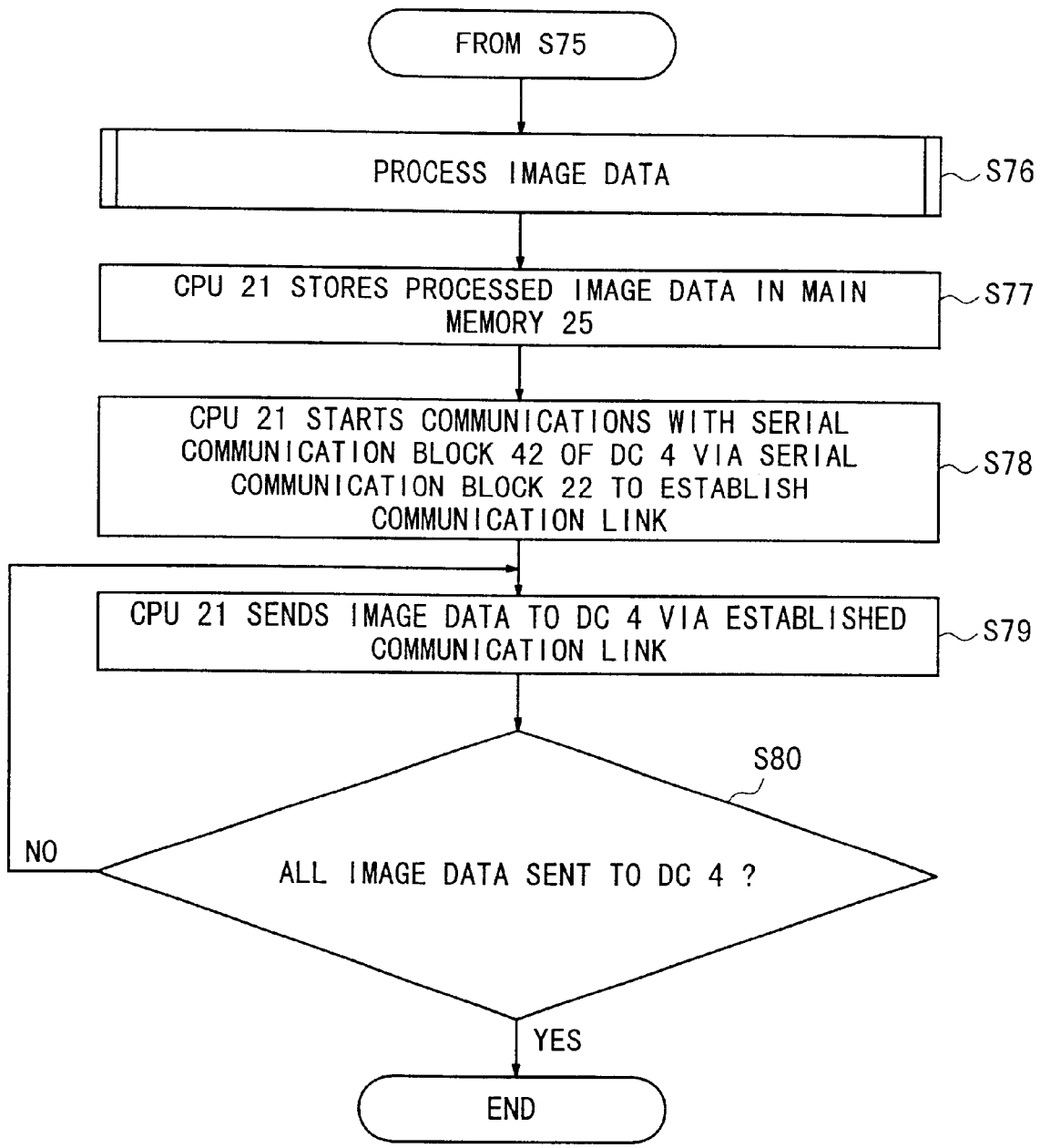
FIG. 17 is a flowchart of a processing sequence of the video game machine in a process of processing image data in the video game machine and supplying the processed image data to the digital camera.

The video game machine 2 processes the image data supplied from the portable computer 3 in step S76 shown in FIG. 17. The image data is processed by the communication and image processing application 50 for resolution conversion, color interpolation, trimming, scaling-up, scaling-down, axis reversal, color reversal, etc., as described later on.

Then, the CPU 21 of the video game machine 2 stores the image data processed in step S76 in the main memory 25 in step S77.

Thereafter, the CPU 21 starts communications with the serial communication block 42 of the digital camera 4 via the serial communication block 22 to establish a communication link therewith in step S78.

Then, the CPU 21 sends the processed data to the digital camera 4 via the established communication link in step S79.

To confirm the end of the transmission of the image data, the CPU 21 decides whether all the image data has been sent or not in step S80. If the CPU 21 confirms that all the image data has been sent, then the video game machine 2 finishes the process of sending the image data. If the CPU 21 confirms that all the image data has not been sent, then the video game machine 2 executes the processing from step S79 again.

Figure 18:
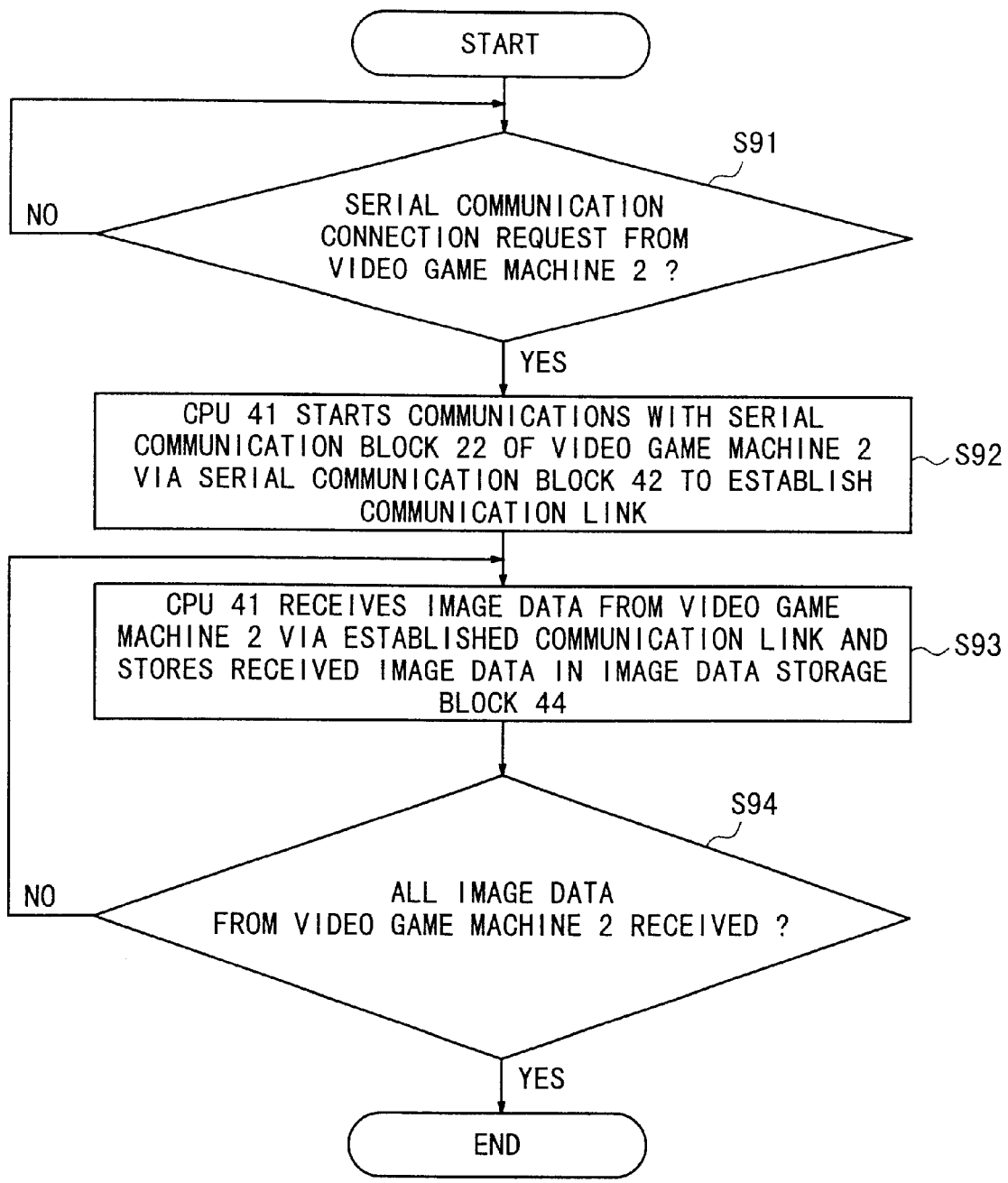
FIG. 18 is a flowchart of a processing sequence of the digital camera in the process of processing image data in the video game machine and supplying the processed image data to the digital camera.

Concurrent with the above process carried out by the video game machine 2, the digital camera 4 decides whether there is a serial communication connection request from the video game machine 2 or not in step S91 shown in FIG. 18.

If the digital camera 4 confirms that there is a serial communication connection request from the video game machine 2 in step S91, then the CPU 41 of the digital camera 4 starts communications with the serial communication block 22 of the video game machine 2 via the serial communication block 42 to establish a communication link therewith in step S92.

Then, the CPU 41 stores the image data received from the video game machine 2 in the image data storage block 44 via the established communication link in step S93.

The processing in steps S92, S93 performed by the digital camera 4 corresponds to the processing in steps S78, S79 performed by the video game machine 2.

To confirm the end of the reception of the image data from the video game machine 2, the CPU 41 decides whether all the image data has been received or not in step S94. If the CPU 41 confirms that all the image data has been received, then the digital camera 4 finishes the process of receiving the image data. If the CPU 41 confirms that all the image data has not been received, then the digital camera 4 executes the processing from step S93 again.

The above processing sequences allow the video game machine 2 to process the image data from the portable computer 3 and supply the processed image data to the digital camera 4. Therefore, the data processing system 1 can use the portable computer 3 as an image input device and the digital camera 4 as an image output device with respect to the video game machine 2.

A process of supplying a plurality of image data from the portable computer 3 to the video game machine 2, combining the image data for superposition or simultaneous display on one screen with the video game machine 2, and supplying the combined image data to the digital camera 4 will be described below with reference to FIGS. 19 through 22.

Figure 19:
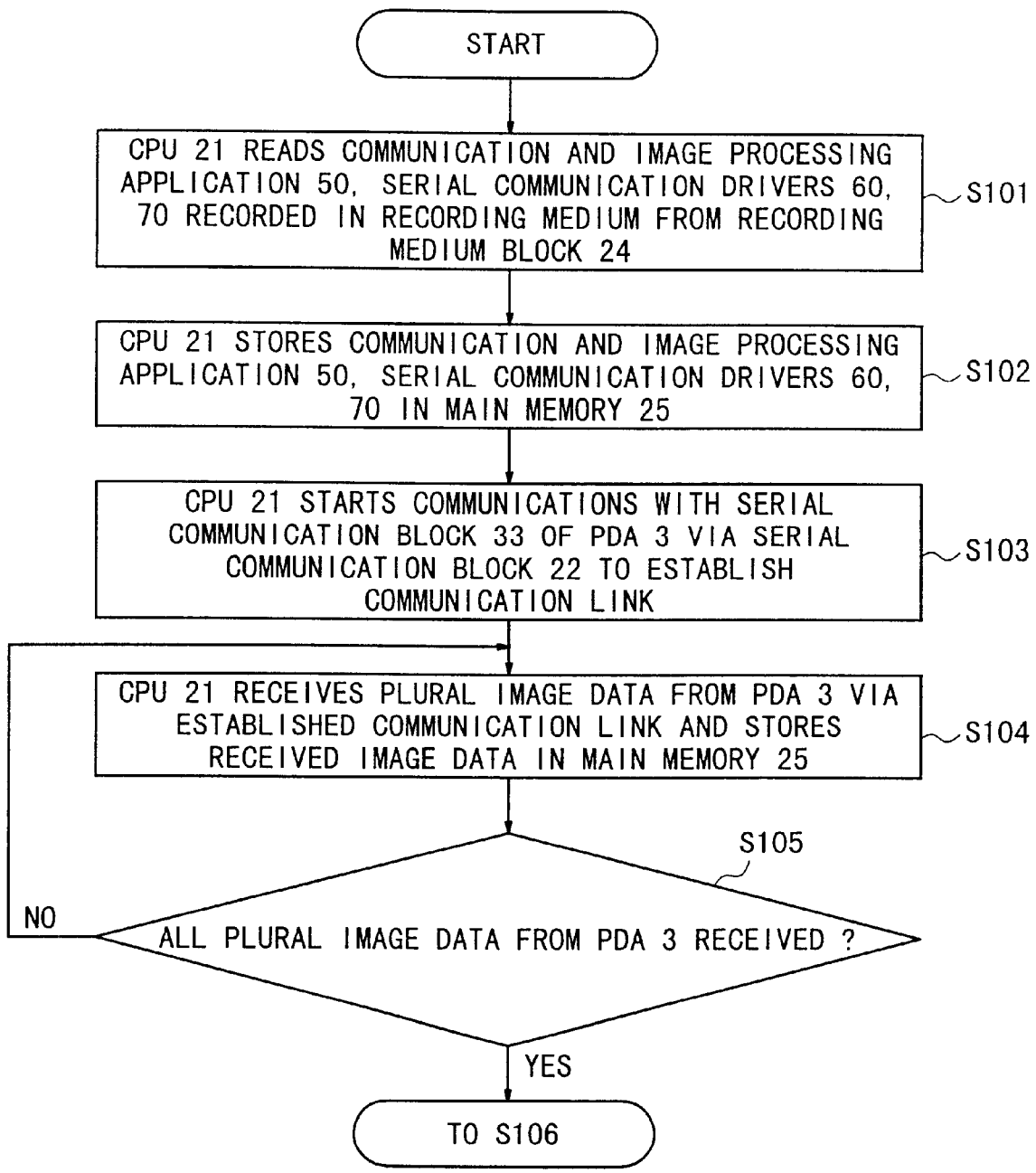
FIG. 19 is a flowchart of a processing sequence of the video game machine in a process of supplying a plurality of image data from the portable computer to the video game machine.

The CPU 21 of the video game machine 2 reads the communication and image processing application 50 and the serial communication drivers 60, 70 for performing serial communications with the portable computer 3 and the digital camera 4, which are recorded in the recording medium (not shown), from the recording medium block 24, in step S101 shown in FIG. 19.

Then, the CPU 21 stores the communication and image processing application 50 and the serial communication drivers 60, 70 in the main memory 25 in step S102.

Thereafter, the CPU 21 starts communications with the serial communication block 33 of the portable computer 3 via the serial communication block 22 to establish a communication link therewith in step S103. Thereafter, the CPU 21 receives a plurality of image data from the portable computer 3 via the established communication link, and stores the received image data in the main memory 25 in step S104.

To confirm the end of the reception of the plural image data from the portable computer 3, the CPU 21 decides whether all the plural image data have been received from the portable computer 3 or not in step S105. If the CPU 21 confirms that all the plural image data have been received, then the video game machine 2 finishes the process of receiving the image data, and control goes to step S106 shown in FIG. 20. If the CPU 21 confirms that all the plural image data have not been received, then the video game machine 2 executes the processing from step S104 again.

Figure 20:
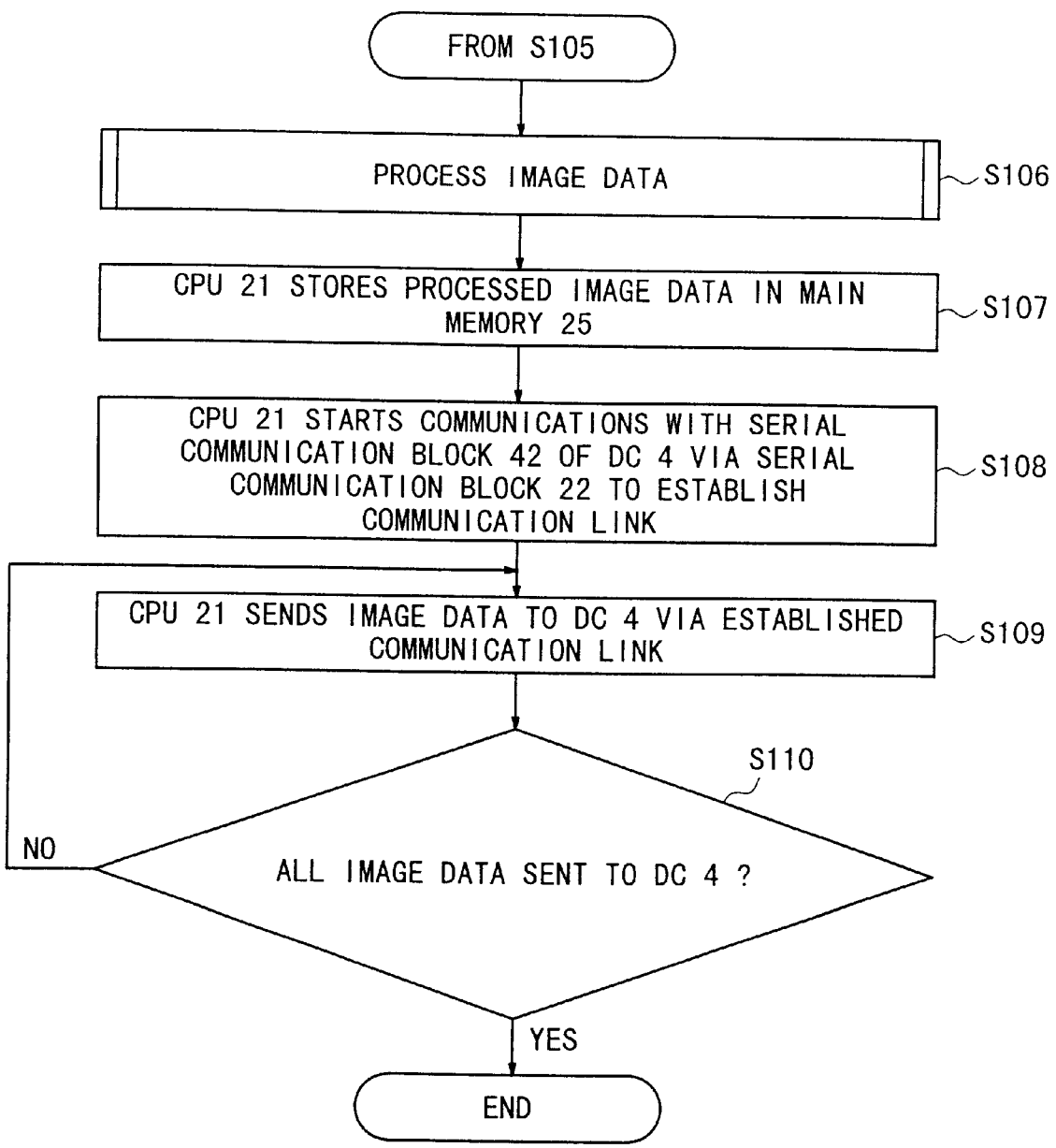
FIG. 20 is a flowchart of a processing sequence of the video game machine in a process of combining a plurality of image data in the video game machine and supplying the combined image data to the digital camera.

The video game machine 2 combines the plurality of image data supplied from the portable computer 3 in step S106 shown in FIG. 20. In step S106, the image data are combined for superposition or simultaneous display on one screen as described above. The image data processing described above may also be carried out in step S106.

Then, the CPU 21 stores the image data combined in step S106 in the main memory 25 in step S107.

Thereafter, the CPU 21 starts communications with the serial communication block 22 of the digital camera 4 via the serial communication block 22 to establish a communication link therewith in step S108.

Thereafter, the CPU 21 transmits the combined image data to the digital camera 4 via the established communication link in step S109.

To confirm the end of the transmission of the image data, the CPU 21 decides whether all the image data has been sent or not in step S110. If the CPU 21 confirms that all the image data has been sent, then the video game machine 2 finishes the process of sending the image data. If the CPU 21 confirms that all the image data has not been sent, then the video game machine 2 executes the processing from step S109 again.

Figure 21:
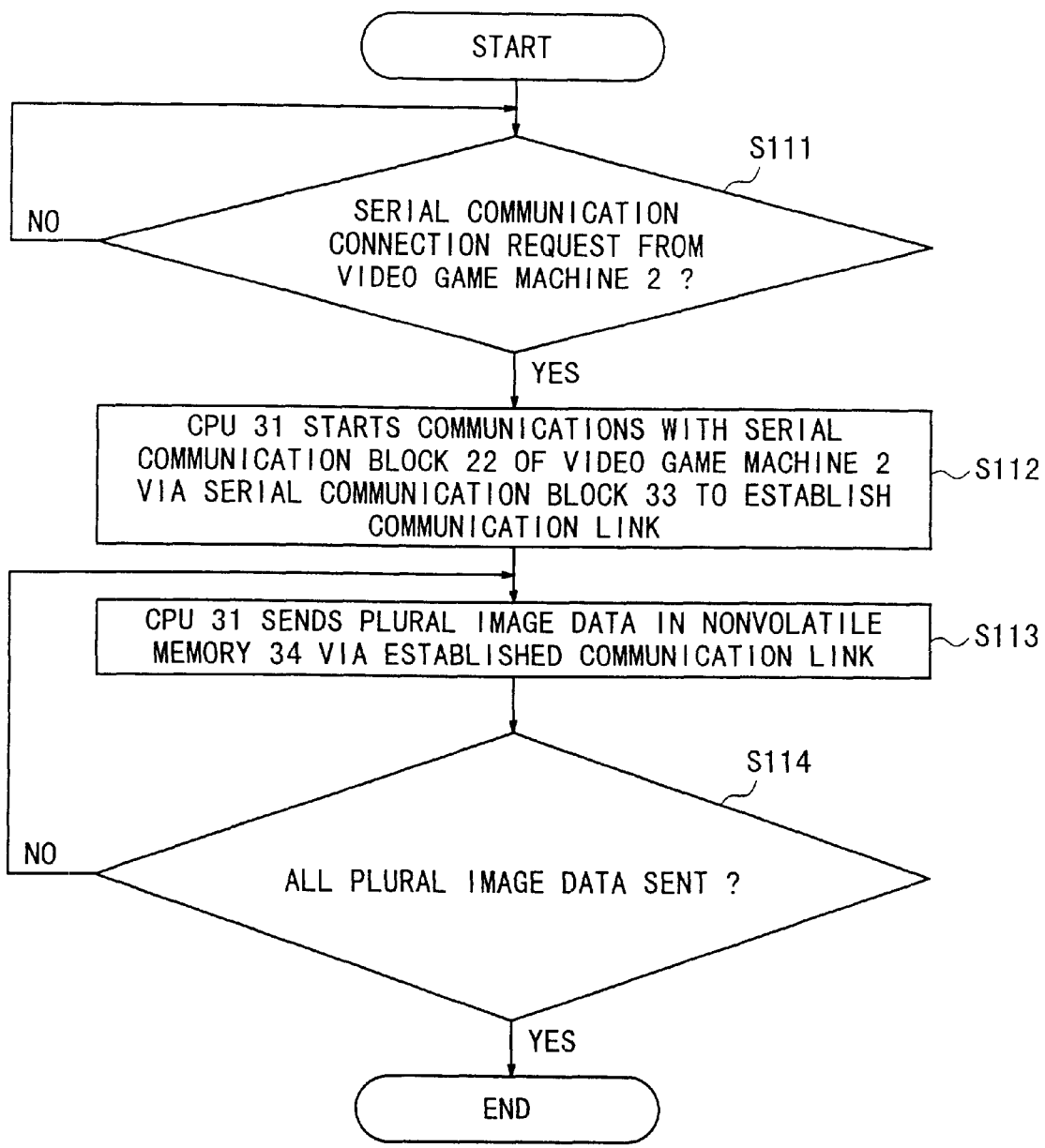
FIG. 21 is a flowchart of a processing sequence of the portable computer in the process of supplying a plurality of image data from the portable computer to the video game machine.

Concurrent with the above process carried out by the video game machine 2, the portable computer 3 decides whether there is a serial communication connection request from the video game machine 2 or not in step S111 shown in FIG. 21.

If the portable computer 3 confirms that there is a serial communication connection request from the video game machine 2 in step S111, then the CPU 31 of the portable computer 3 starts communications with the serial communication block 22 of the video game machine 2 via the serial communication block 33 to establish a communication link therewith in step S112.

Then, the CPU 31 sends a plurality of image data stored in the nonvolatile memory 34 to the video game machine 2 via the established communication link in step S113.

The processing in steps S112, S113 performed by the portable computer 3 corresponds to the processing in steps S103, S104 performed by the video game machine 2.

To confirm the end of the transmission of the plural image data, the CPU 31 decides whether all the plural image data have been sent to the video game machine 2 or not in step S114. If the CPU 41 confirms that all the plural image data have been sent to the video game machine 2, then the portable computer 3 finishes the process of sending the plural image data. If the CPU 31 confirms that all the plural image data have not been sent to the video game machine 2, then the portable computer 3 executes the processing from step S113 again.

Figure 22:
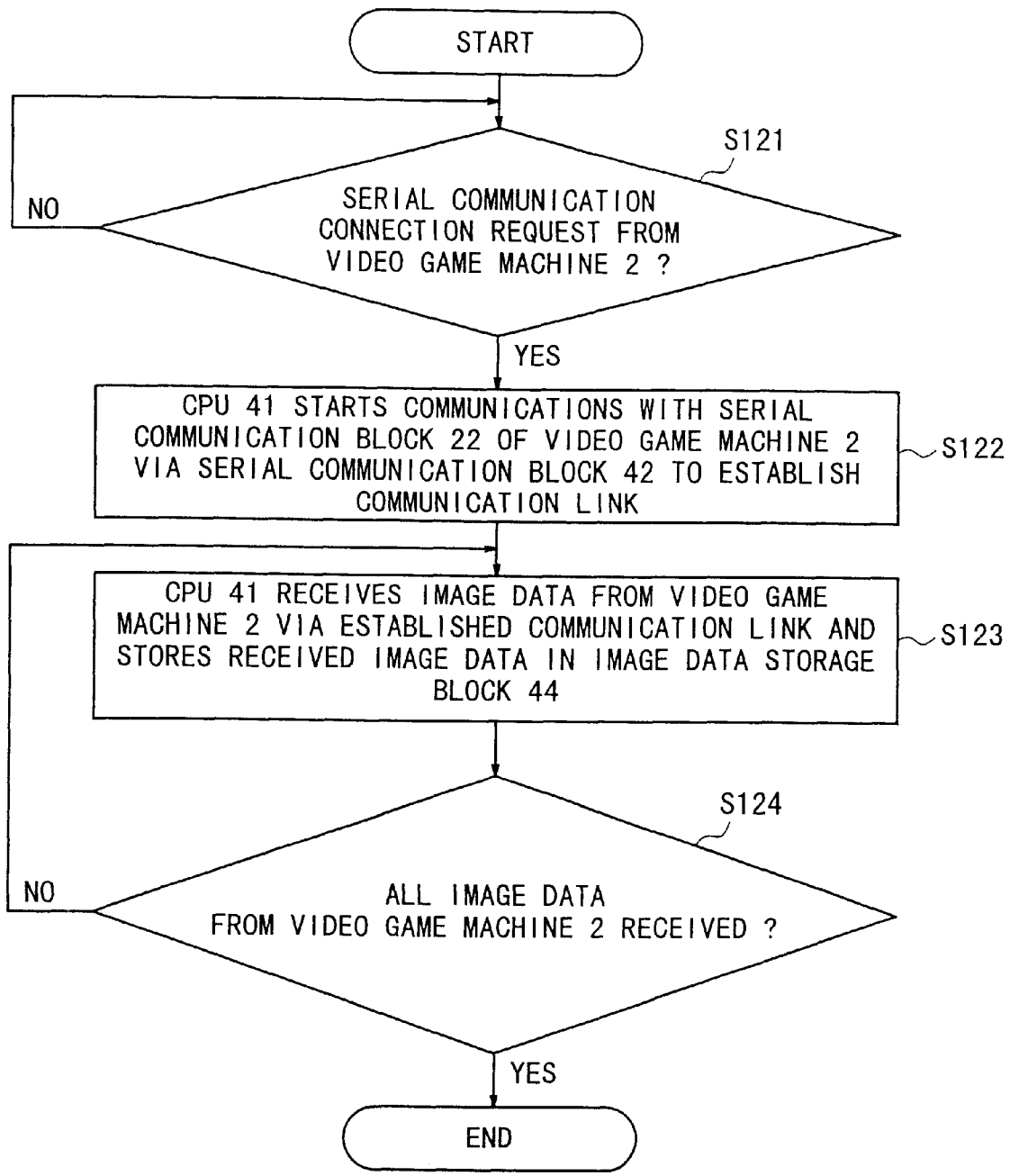
FIG. 22 is a flowchart of a processing sequence of the digital camera in the process of combining a plurality of image data in the video game machine and supplying the combined image data to the digital camera.

The digital camera 4 decides whether there is a serial communication connection request from the video game machine 2 or not in step S121 shown in FIG. 22.

If the digital camera 4 confirms that there is a serial communication connection request from the video game machine 2 in step S121, then the CPU 41 of the digital camera 4 starts communications with the serial communication block 22 of the video game machine 2 via the serial communication block 42 to establish a communication link therewith in step S122.

Then, the CPU 41 stores the image data received from the video game machine 2 in the image data storage block 44 via the established communication link in step S123.

The processing in steps S122, S123 performed by the digital camera 4 corresponds to the processing in steps S108, S109 performed by the video game machine 2.

To confirm the end of the reception of the image data from the video game machine 2, the CPU 41 decides whether age all the image data has been received or not in step S124. If the CPU 41 confirms that all the image data has been received, then the digital camera 4 finishes the process of receiving the image data. If the CPU 41 confirms that all the image data has not been received, then the digital camera 4 executes the processing from step S123 again.

The above processing sequences in the data processing system 1 allow the video game machine 2 to combine the plural image data supplied from the portable computer 3 to the video game machine 2, and supply the combined image data to the digital camera 4.

When image data from the portable computer 3 is supplied via the video game machine 2 to the digital camera 4, the video game machine 2 can process and combine the image data according to the communication and image processing application 50 while in a variable mode in response to manually entered commands from the input block 23, and display the processed image data in a real-time fashion on the video monitor 5. A process of variably processing and combining image data will be described below with reference to FIG. 23. The process shown in FIG. 23 is directed to selective processing of the image data supplied from the portable computer 3 for resolution conversion, color interpolation, and trimming, and other image data processing modes are omitted from the process shown in FIG. 23.

Figure 23:
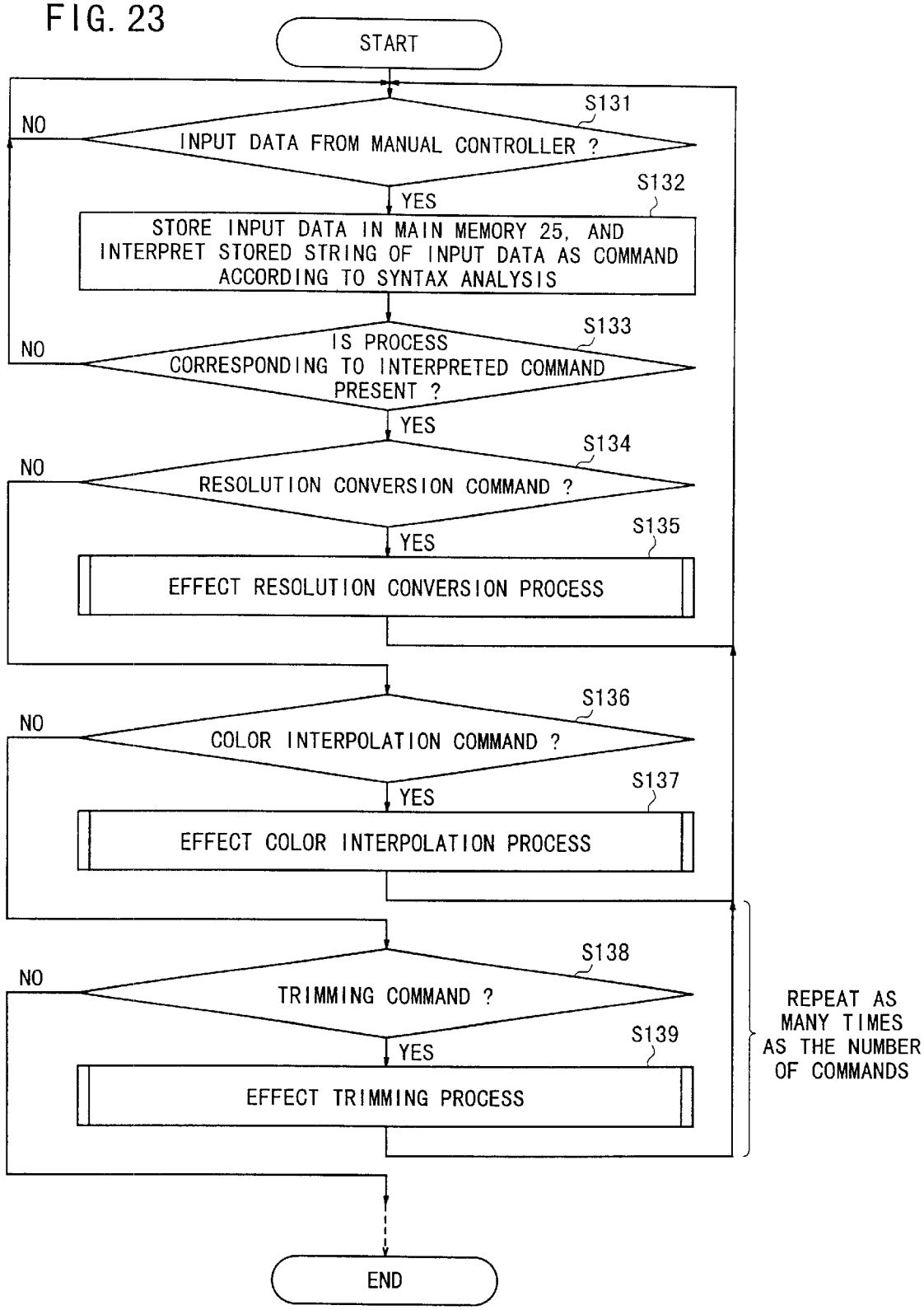
FIG. 23 is a flowchart of a processing sequence of a process of processing and combining image data supplied from the portable computer to the video game machine, variably in response to manually entered commands.

The video game machine 2 decides whether there is input data from the manual controller of the input block 23 or not in step S131 shown in FIG. 23.

If the video game machine 2 confirms that there is input data from the manual controller in step S131, then the CPU 21 stores the input data in the main memory 25, and interprets the stored string of input data as a command according to a syntax analysis in step S132.

The video game machine 2 decides in step S133 whether a processing and combining process corresponding to the command interpreted in step S132 is present in the communication and image processing application 50 and can be executed or not. If there is a processing and combining process corresponding to the command, then control goes to step S134. If there is not a processing and combining process corresponding to the command, then the video game machine 2 executes the processing from step S131 again.

The video game machine 2 decides whether the interpreted command is a resolution conversion command or not in step S134. If the interpreted command is a resolution conversion command, then the video game machine 2 performs a resolution conversion process in step S135 to convert the resolution of the image data to a resolution that can be used by the digital camera 4. If the interpreted command is not a resolution conversion command, then the video game machine 2 decides whether the interpreted command is a color interpolation command or not in step S136. If the interpreted command is a color interpolation command, then the video game machine 2 performs a color interpolation process in step S137. If the interpreted command is not a color interpolation command, then the video game machine 2 decides whether the interpreted command is a trimming command or not in step S138. If the interpreted command is a trimming command, then the video game machine 2 performs a trimming process in step S139. If the interpreted command is not a trimming command, then control goes to other processes including a scaling-up process, a scaling-down process, etc., after which the process of variably processing and combining image data is finished.

As described above, when image data is sent and received between the portable computer 3 of the data processing system 1 and the digital camera 4, the image data can be processed and combined by the video game machine 2 variably in response to manually entered commands from the user. The image data thus processed and combined can be displayed in a real-time fashion on the video monitor 5 connected to the video game machine 2. In the data processing system 1, after it is confirmed that the image data from the portable computer 3 has been processed and combined by the video game machine 2 into image data that satisfies the need of the user, the processed and combined image data can be supplied to the digital camera 4.

A process of supplying image data to the video game machine 2 from both the portable computer 3 and the digital camera 4, processing the image data with the video game machine 2, and outputting the processed image data to the portable computer 3 will be described below.

In the data processing system 1, the above process can be performed by combining the processes shown in FIGS. 10 through 13, 19, and 21.

The video game machine 2 carries out steps shown in FIG. 10 to receive a plurality of image data from the digital camera 4.

Specifically, the video game machine 2 reads the communication and image processing application 50 and the serial communication drivers 60, 70, which are recorded in the recording medium (not shown), and stores them in the main memory 25. The video game machine 2 establishes a communication link with the digital camera 4, receives a plurality of image data from the digital camera 4, and stores the received data in the main memory 25. After the video game machine 2 confirms that all the plural image data from the digital camera 4 have been received, the video game machine 2 carries out steps shown in FIG. 19.

The video game machine 2 carries out steps shown in FIG. 19 to receive a plurality of image data from the portable computer 3.

Specifically, the video game machine 2 reads the communication and image processing application 50 and the serial communication drivers 60, 70, which are recorded in the recording medium (not shown), and stores them in the main memory 25. The video game machine 2 establishes a communication link with the portable computer 3, receives a plurality of image data from the portable computer 3, and stores the received data in the main memory 25. After the video game machine 2 confirms that all the plural image data from the portable computer 3 have been received, the video game machine 2 carries out steps shown in FIG. 11.

The video game machine 2 processes and combines the plural image data received from the portable computer 3 and the digital camera 4, and stores the processed and combined image data in the main memory 25. The image data are processed and combined in the same manner as described above to generate image data that can be used by the portable computer 3. The video game machine 2 can process and combine the image data in response to manually entered commands from the manual controller, and display the processed and combined image data in a real-time manner on the video monitor 5 as shown in FIGS. 14 and 23.

Then, the video game machine 2 establishes a communication link with the portable computer 3, and sends the image data to the portable computer 3.

Concurrent with the above process carried out by the video game machine 2, the portable computer 3 and the digital camera 4 carry out steps shown in FIGS. 12, 21, and 13.

Specifically, the digital camera 4 establishes a communication link with the video game machine 2, and sends a plurality of image data stored in the image data storage block 44 to the video game machine 2, as shown in FIG. 12.

Thereafter, the portable computer 3 carries out steps shown in FIG. 21. The portable computer 3 establishes a communication link with the video game machine 2, and sends a plurality of image data stored in the nonvolatile memory 34 to the video game machine 2.

After the portable computer 3 and the digital camera 4 have sent the plural image data to the video game machine 2, the portable computer 3 carries out steps shown in FIG. 13, and receives image data from the video game machine 2.

Specifically, the portable computer 3 establishes a communication link with the video game machine 2, and receives image data processed and combined by the video game machine 2, after which the processing sequence is finished.

As described above, in the data processing system 1, a plurality of image data can be sent from the portable computer 3 and the digital camera 4 to the video game machine 2, the image data can be processed and combined by the video game machine 2, and the processed and combined image data can be sent to the portable computer 3.

In the data processing system, steps shown in FIG. 13 may be changed to steps shown in FIG. 18 and carried out, so that the image data can be sent to not only the portable computer 3 but also the digital camera 4.

A process of sending application software which uses image data sent from the video game machine 2 to the portable computer 3, from the video game machine 2 to the portable computer 3 will be described below with reference to FIGS. 24 and 25.

Figure 24:
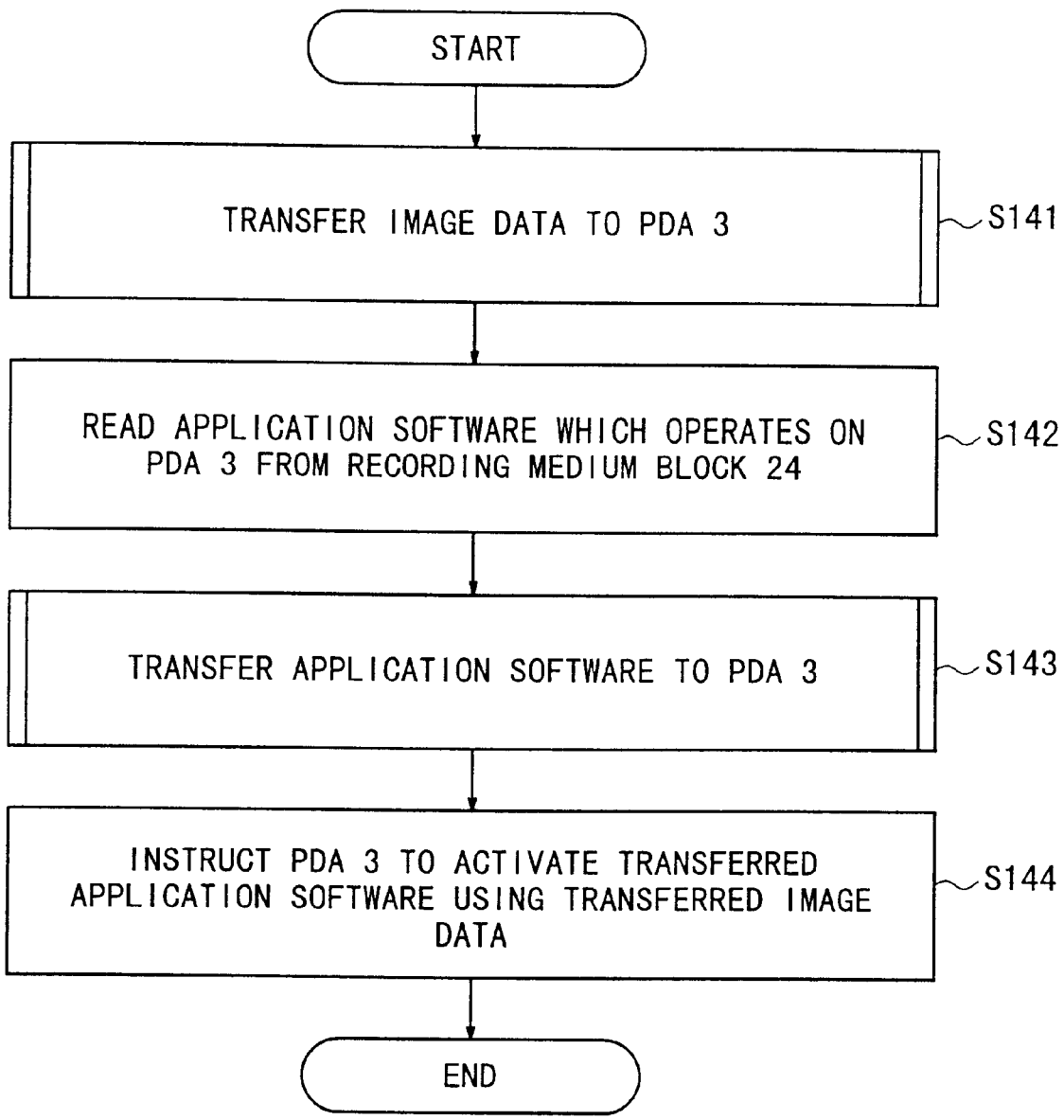
FIG. 24 is a flowchart of a processing sequence of the video game machine in a process of supplying application software to be used by the portable computer from the video game machine and activating the portable computer.

The video game machine 2 transfers image data to the portable computer 3 in step S141 shown in FIG. 24. Specifically, as described above, the video game machine 2 supplies image data, which has been sent from the digital camera 4 or both the portable computer 3 and the digital camera 4, to the portable computer 3.

Then, the video game machine 2 reads application software recorded in the non-illustrated recording medium from the recording medium block 24 in step S142. The application software operates on the portable computer 3, using the image data supplied to the portable computer 3.

The video game machine 2 transfers the application software in step S143. Specifically, the application software is transferred in substantially the same manner as when the image data is transferred as described above. In this fashion, the video game machine 2 supplies the application software to the portable computer 3.

Then, the video game machine 2 instructs the portable computer 3 to activate the transferred application software, after which the processing sequence is ended.

Figure 25:
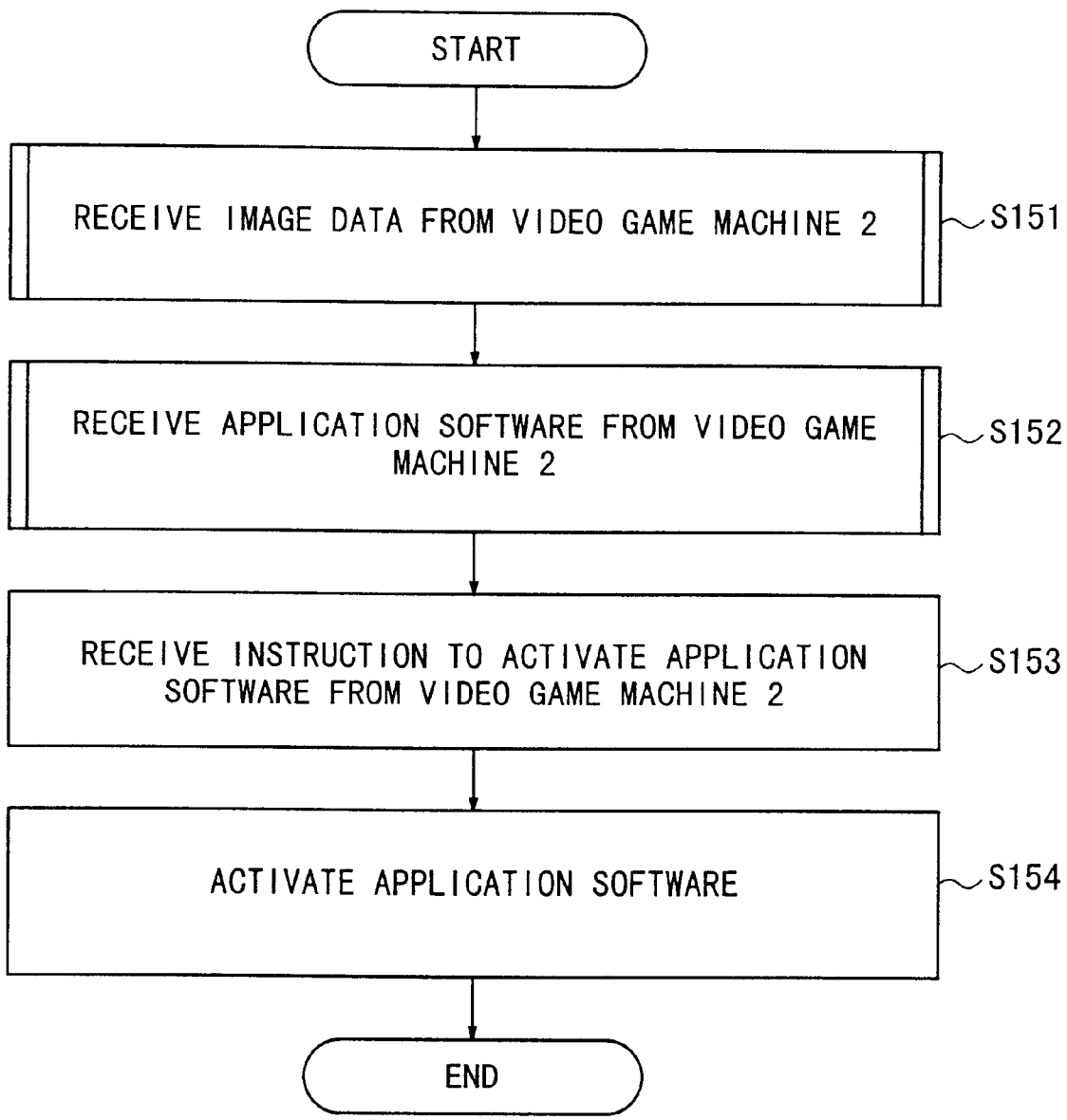
FIG. 25 is a flowchart of a processing sequence of the portable computer in the process of supplying application software to be used by the portable computer from the video game machine and activating the portable computer.

Concurrent with the above process carried out by the video game machine 2, the portable computer 3 receives the image data in step S151 shown in FIG. 25. Specifically, the portable computer 3 receives the image data from the video game machine 2.

Then, the portable computer 3 receives the application software from the video game machine in step S152. Specifically, the application software is received via the serial communication block 33 in substantially the same manner as when the image data is received as described above. In this fashion, the portable computer 3 receives the application software from the video game machine 2.

Then, the portable computer 3 is instructed by the video game machine 2 to activate the application software supplied from the video game machine 2 in step S153.

The processing in steps S152, S153 performed by the portable computer 3 corresponds to the processing in steps S143, S144 performed by the video game machine 2.

Having received the activating instruction, the portable computer 3 activates the application software in step S154 to display the image data received from the video game machine 2 on the display block 32 and perform other data processing.

In the data processing system 1, as described above, application software which can operate on the portable computer 3 can be read from the recording medium loaded in the video game machine 2 and supplied to the portable computer 3. Therefore, the data processing system 1 can provide the portable computer 3 with a function to read and use image data. In the data processing system 1, furthermore, the above application software, the communication and image processing application 50, and the serial communication drivers 60, 70 can be supplied from a single recording medium.

In the data processing system 1, as described above, the portable computer 3 and the digital camera 4 which are difficult to connect directly to each other are simultaneously connected to the video game machine 2 for sending and receiving image data between the portable computer 3 and the digital camera 4.

In the data processing system 1, when image data is to be sent and received between devices having different resolutions, i.e., the portable computer 3 and the digital camera 4, the image data can be processed for resolution conversion, color reduction, color interpolation, and various format conversions, allowing the image data to be sent and received between the portable computer 3 and the digital camera 4.

Furthermore, the processed and combined image data can be displayed on a real-time basis on the video monitor 5, using the quick graphic display function of the video game machine 2. Therefore, the data processing system 1 allows the user to confirm whether the processed and combined image data is acceptable or not, before the image data is sent and received. The data processing system 1 thus provides appropriate feedback to the user.

In the data processing system 1, moreover, a plurality of image data from the portable computer 3 and a plurality of image data from the digital camera 4 can be supplied to the video game machine 2, the supplied image data can be processed and combined by the video game machine 2, and the processed and combined image data can be transferred to the portable computer 3 or the digital camera 4. The data processing system 1 is thus compatible with a plurality of image sources, and can easily edit image data from such plural image sources.

In the data processing system 1, application software which can operate on the portable computer 3 is supplied from the video game machine 2, and the video game machine 2 instructs the portable computer 3 to activate the application software. The data processing system 1 can thus provide the portable computer 3 with a function to read and use external image data.

In the video game machine 2, the communication and image processing application 50, the serial communication drivers 60, 70, and the application software supplied to the portable computer 3 do not need to be recorded in the recording medium such as a CD-ROM, but may be acquired by communications with an external source.

An entertainment system, which is a specific example of the data processing system, will be described below with reference to FIGS. 26 through 30. In FIGS. 26 through 30, the video game machine 2 and the portable computer 3 of the data processing system 1 are constructed as an entertainment system which comprises a video game apparatus 301 and a portable electronic device 400.

Figure 31:
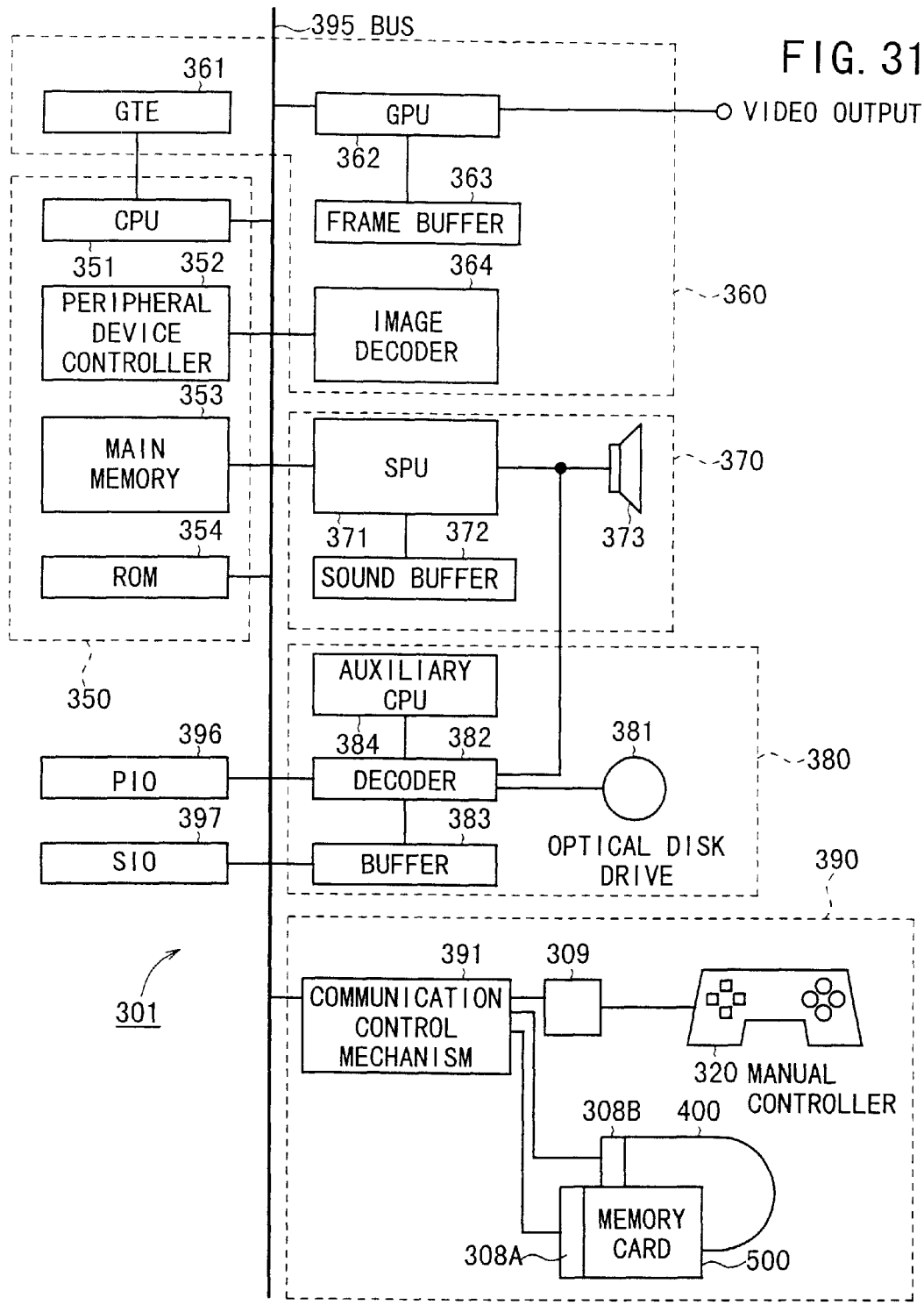
FIG. 31 is a block diagram of a video game apparatus as a specific example of the video game machine.
Figure 32:
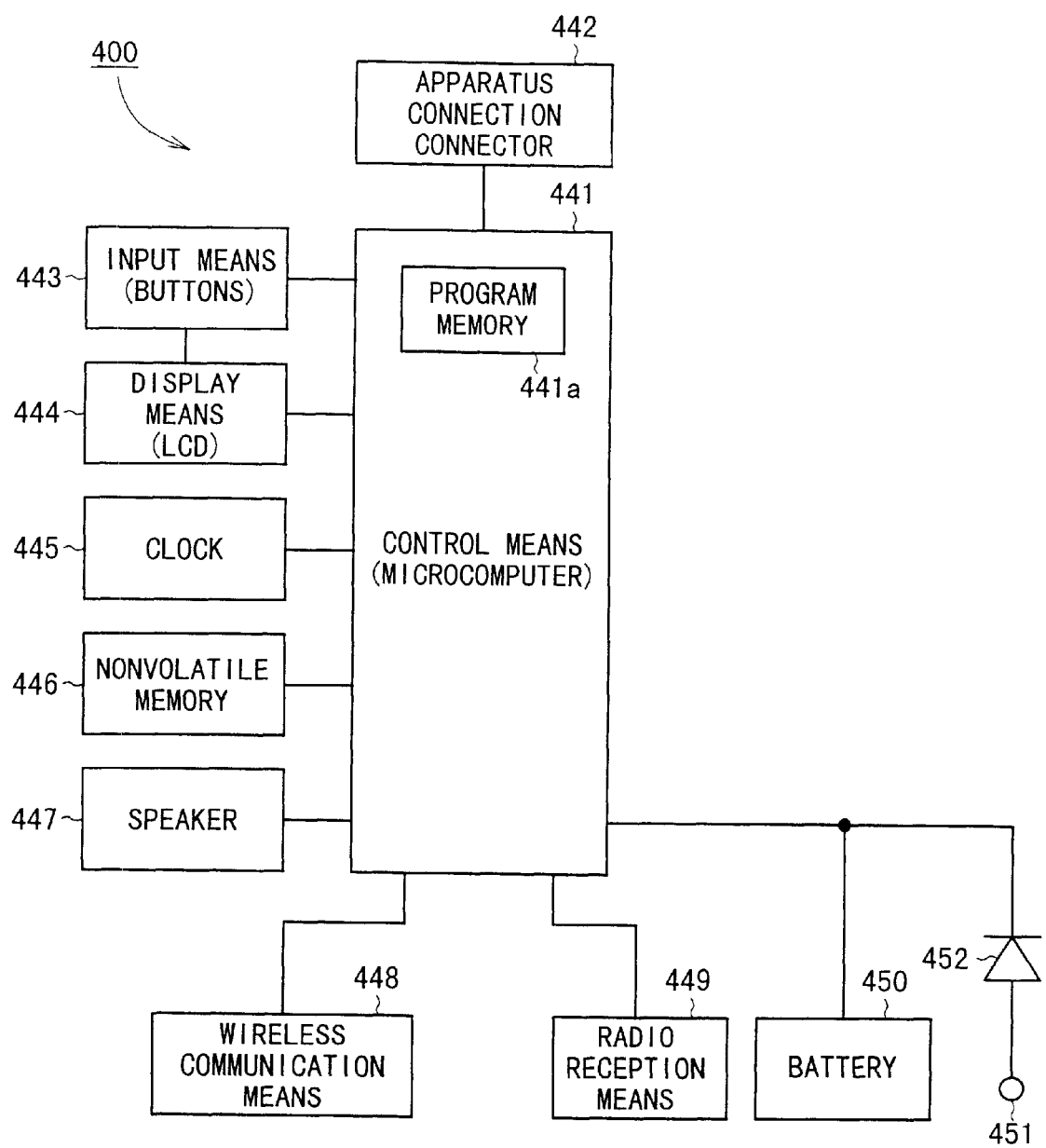
FIG. 32 is a block diagram of the portable electronic device as a specific example of the portable computer.

The video game machine 2 corresponds to the video game apparatus 301, and the portable computer 3 corresponds to the portable electronic device 400. Specifically, the CPU 21, the serial communication block 22 and the input block 23 of the video game machine 2 correspond respectively to a CPU 351, memory card insertion slots 308A, 308A or a serial I/O interface (SIO) 397, and a manual controller 320 of the video game apparatus 301 as shown in FIG. 31. The CPU 31, the display block 32, and the serial communication block 33 of the portable computer 3 correspond respectively to a control means 441, a display means 444, and an apparatus connection connector 442 as shown in FIG. 32.

Figure 26:
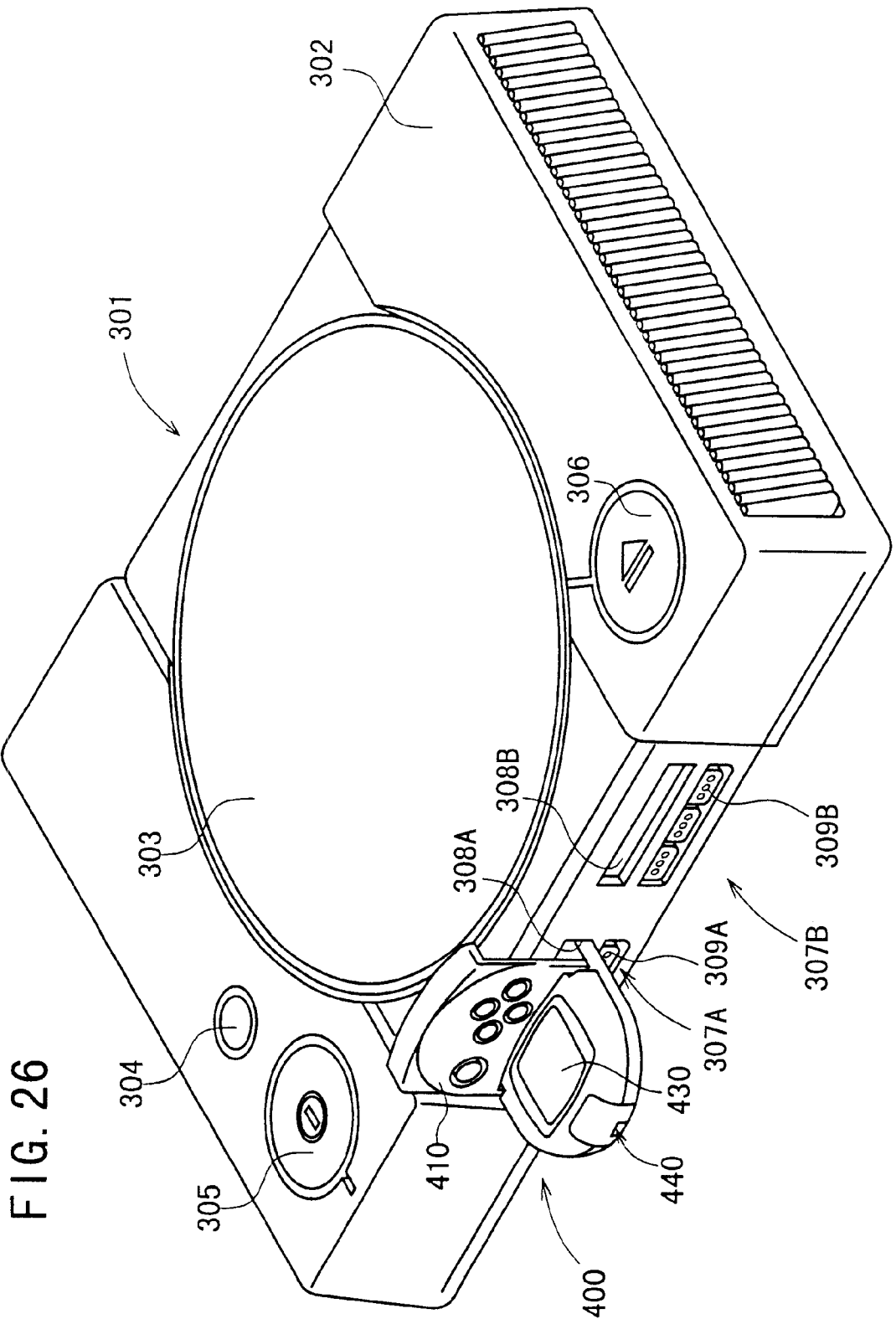
FIG. 26 is a perspective view of an entertainment system as a specific example of the data processing system which comprises the video game machine and the portable computer.
Figure 27:
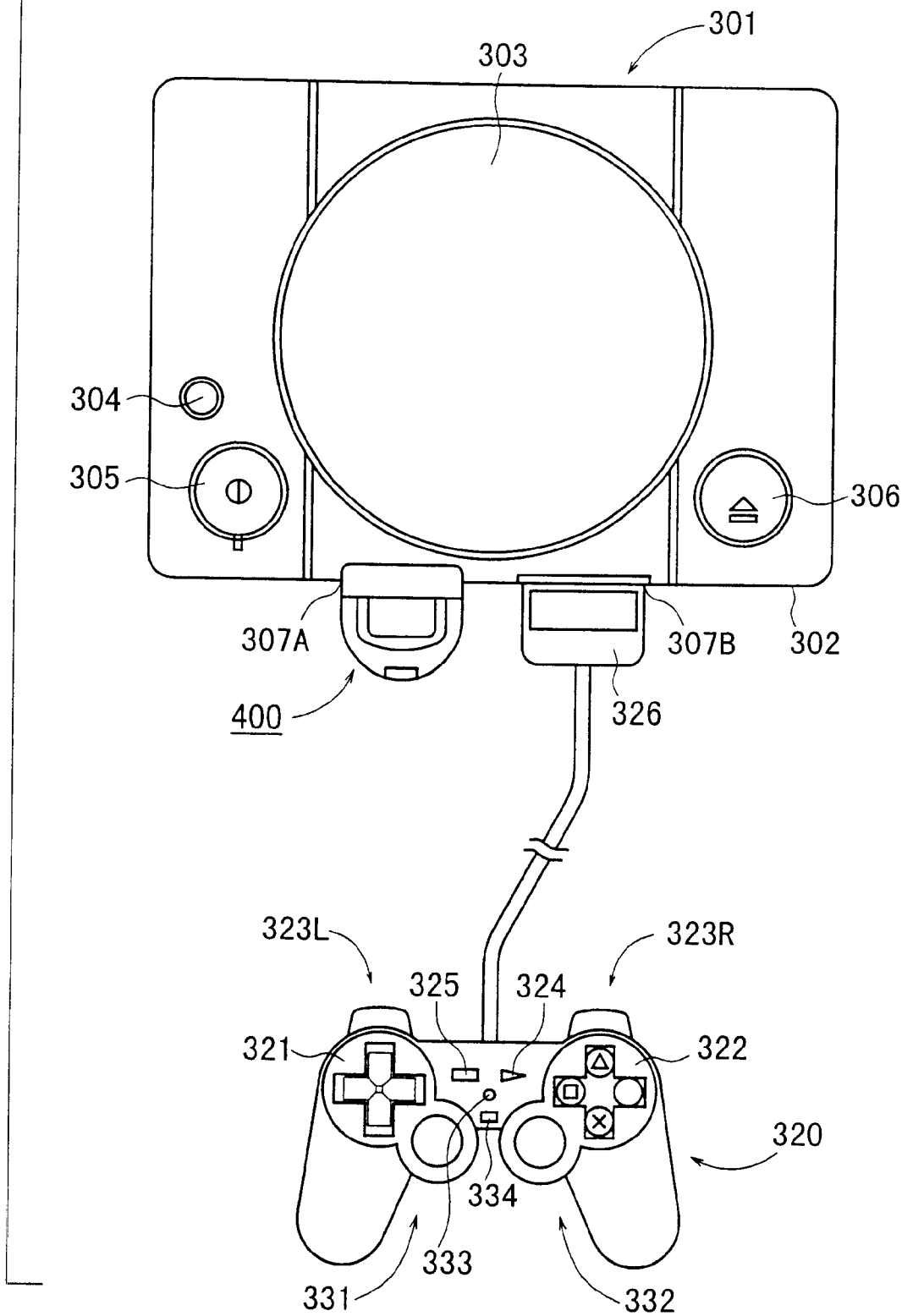
FIG. 27 is a plan view of the entertainment system.

As shown in FIGS. 26 and 27, the video game apparatus 301 reads an application program from a recording medium, and executes the application program according to instructions from the user, i.e., the game player. For example, the video game apparatus 301 executes a game program mainly to control the progress of a game, the display of game images, and the output of sounds.

The video game apparatus 301 has a rectangular casing 302 which houses a disk loading unit 303 substantially centrally therein for loading an optical disk such as a CD-ROM or the like as a recording medium for supplying application programs including video games, the communication and image processing application 50, the application software used by the portable electronic device 400. The casing 302 supports a reset switch 304 for resetting a video game, a power supply switch 305, a disk control switch 306 for controlling the loading of the optical disk, and two slots assemblies 307A, 307B.

The video game apparatus 301 may be supplied with application programs via a communication link, rather than being supplied from the recording medium.

The portable electronic device 400 and the manual controller 320 can be connected to the slots assemblies 307A, 307B. A memory card system (not shown) may also be connected to the slots assemblies 307A, 307B.

The portable electronic device 400 and the manual controller 320 can be connected to the slot assemblies 307A, 307B. Specifically, the portable electronic device 400 can be connected to slots 308A, 308A in the slot assemblies 307A, 307B, and the manual controller 320 can be connected to slots 309A, 309A in the slot assemblies 307A, 307B.

The manual controller 320 has first and second control pads 321, 322, a left button 323L, a right button 323R, a start button 324, a selector button 325, analog control pads 331, 332, a mode selector switch 333 for selecting control modes for the analog control pads 331, 332, and an indicator 334 for indicating a selected control mode. The manual controller 320 also has a vibration imparting mechanism (not shown) disposed therein for imparting vibrations to the manual controller 320 depending on how the video game proceeds. The manual controller 320 is electrically connected to the slot 307B in the casing 302 by a connector 326.

If two manual controllers 320 are connected respectively to the slots 307A, 307B, two users or game players can share the entertainment system to play a competition game, for example. The video game apparatus 301 may have more or less than two slots 307A, 307B.

Figure 28:
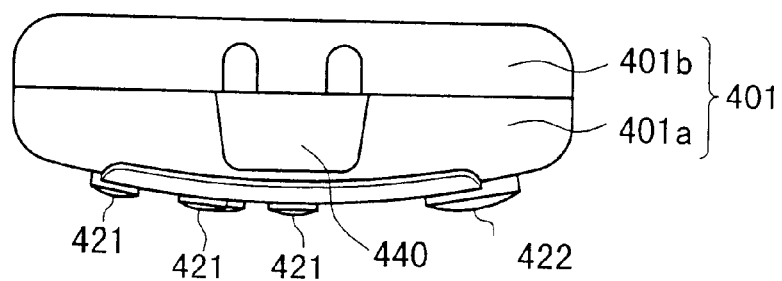
FIG. 28 is a plan view of a portable electronic device as a specific example of the portable computer.
Figure 29:
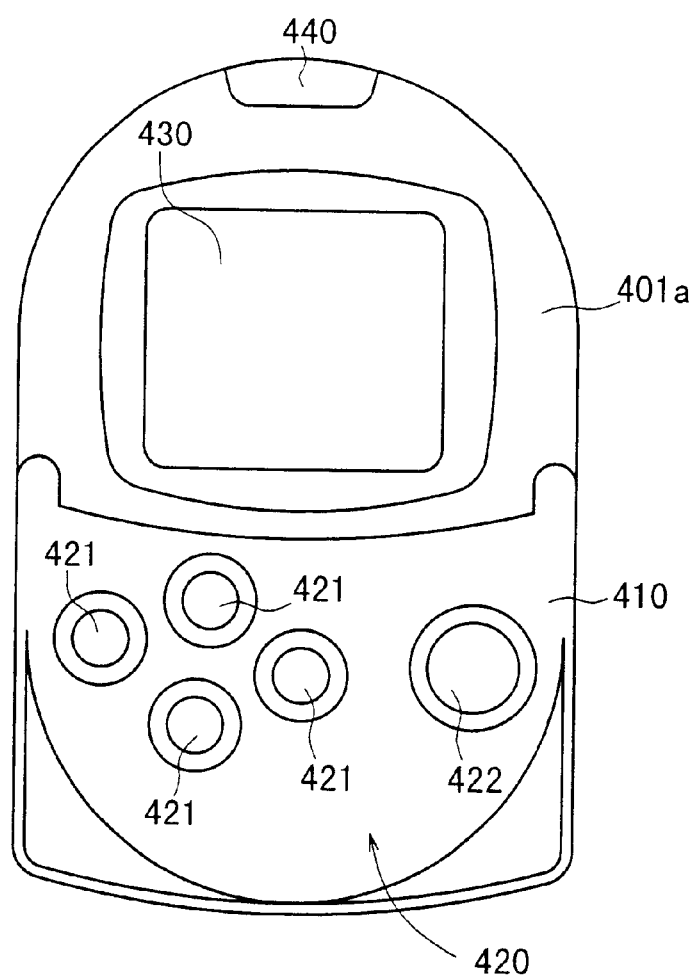
FIG. 29 is a front elevational view of the portable electronic device shown in FIG. 28.
Figure 30:
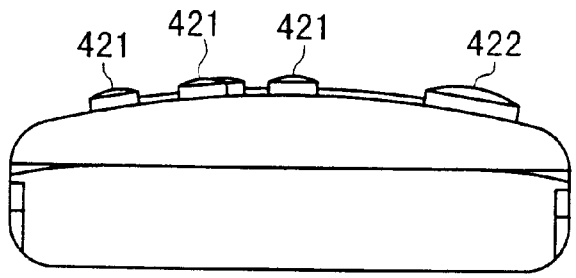
FIG. 30 is a bottom view of the portable electronic device shown in FIG. 28.

As shown in FIGS. 28 through 30, the portable electronic device 400 has a housing 401 which supports a manual control pad 420 for entering various items of information, a display unit 430 such as a liquid crystal display (LCD) unit or the like, and a window 440 for wireless communication such as infrared communication with a wireless communication command unit.

The housing 401 comprises an upper shell 401a and a lower shell 401b, and houses a board which supports memory devices, etc. thereon. The housing 401 is shaped so as to be insertable into either one of the slots 307A, 307B in the casing 302.

The window 440 is mounted on a substantially semicircular end of the housing 401. The display unit 430 occupies a substantially half area of the upper shell 401a of the housing 401, and is positioned near the window 440.

The manual control pad 420 has a plurality of control buttons 421, 422 for entering events and making various selections. The manual control pad 420 occupies the other substantially half area of the upper shell 401a, and is positioned remotely from the window 440. The manual control pad 420 is disposed on a lid 410 that is angularly movably supported on the housing 401. The control buttons 421, 422 extend through the lid 410 from its upper surface to its lower surface. The control buttons 421, 422 are supported on the lid 410 for movement into and out of the upper surface of the lid 410.

The portable electronic device 400 has a board disposed in the housing 410 and facing the lid 410 as it is closed over the housing 401. The board supports a plurality of switch pressers held in alignment with the respective control buttons 421, 422 when the lid 410 is closed over the housing 401. When one of the control buttons 421, 422 is pressed by the user, it actuates the corresponding switch presser to press a pressure switch such as a diaphragm switch, for example.

As shown in FIG. 26, the portable electronic device 400 with the lid 410 being open is inserted into the slot 307A in the casing 302 of the video game apparatus 301. FIGS. 29 and 30 show circuit arrangements of the video game apparatus 301 and the portable electronic device 400.

As shown in FIG. 31, the video game apparatus 301 comprises a control system 350 including a central processing unit (CPU) 351 and its peripheral devices, a graphic system 360 including a graphic processing unit (GPU) 362 for plotting image data in a frame buffer 363, a sound system 370 including a sound processing unit (SPU) 371 for generating music sounds and sound effects, an optical disk controller 380 for controlling an optical disk in which application programs are recorded, a communication controller 390 for controlling signals from the manual controller 320 which emitter instructions from the user, and data supplied to and from the memory card 500 which stores game settings and the portable electronic device 400, a bus 395 to which the control system 350, the graphic system 360, the sound system 370, the optical disk controller 380, and the communication controller 390 are connected, and a parallel I/O interface (PIO) 396 and a serial I/O interface (SIO) 397 which interface another apparatus.

The control system 350 comprises a CPU 351, a peripheral device controller 352 for controlling interrupts and direct memory access (DMA) data transfer, a main memory 353 comprising a random-access memory (RAM), and a read-only memory (ROM) 354 for storing various programs such as an operating system or the like for managing the main memory 353, the graphic system 360, and the sound system 370.

The CPU 351 controls the video game apparatus 301 in its entirety by executing the operating system stored in the ROM 354.

When the video game apparatus 301 is turned on, the CPU 351 executes the operating system stored in the ROM 354 to start controlling the graphic system 360, the sound system 370, etc. For example, when the operating system is executed, the CPU 351 initializes the video game apparatus 301 in its entirety for confirming its operation, and thereafter controls the optical disc controller 380 to execute an application program recorded in the optical disk. As the application program is executed, the CPU 351 controls the graphic system 360, the sound system 370, etc. depending on instructions entered from the user for thereby controlling the display of images and the generation of music sounds and sound effects.

The CPU 351 corresponds to the CPU 21 of the video game machine 2, and restores data received by and sent from the portable electronic device 400.

The graphic system 360 functions as the graphic processor 26 of the video game machine 2. The graphic system 360 comprises a geometry transfer engine (GTE) 361 for performing coordinate transformations and other processing, a graphic processing unit (GPU) 362 for generating image data according to commands from the CPU 351, a frame buffer 363 for storing image data generated by the GPU 362, and an image decoder 364 for decoding image data compressed and encoded by an orthogonal transform such as a discrete cosine transform.

The GTE 361 has a parallel arithmetic mechanism for performing a plurality of arithmetic operations parallel to each other, and can perform coordinate transformations, light source calculations, matrixes, or vectors at a high speed in response to a request from the CPU 351. Specifically, the GTE 361 can calculate the coordinates of a maximum of 1.5 million polygons per second for a flat shading process to plotting one triangular polygon with one color, for example. With the GTE 361, the video game apparatus 301 is able to reduce the burden on the CPU 351 and perform high-speed coordinate calculations.

According to an image generating command from the CPU 351, the GPU 362 generates and stores a polygon or the like in the frame buffer 363. The GPU 362 is capable of generating a maximum of 360 thousand polygons per second.

The frame buffer 363 comprises a dual-port RAM, and is capable of simultaneously storing image data generated by the GPU 362 or image data transferred from the main memory 353, and reading image data for display. The frame buffer 363 has a storage capacity of 1 Mbytes, for example, and is handled as a 16-bit matrix made up of a horizontal row of 1024 pixels and a vertical column of 512 pixels.

The frame buffer 363 has a display area for storing image data to be outputted as video output data, a CLUT (color look-up table) area for storing a color look-up table which will be referred to by the GPU 362 when it generates a polygon or the like, and a texture area for storing texture data to be subjected to coordinate transformations when a polygon is generated and mapped onto a polygon plotted by the GPU 362. The CLUT area and the texture area are dynamically varied as the display area is varied.

The image decoder 364 is controlled by the CPU 351 to decode image data of a still or moving image stored in the main memory 353, and store the decoded image into the main memory 353. Image data reproduced by the image decoder 364 is transferred to the frame buffer 363 by the GPU 362, and can be used as a background for an image plotted by the GPU 362.

The sound system 370 comprises an SPU 371 for generating music sounds, sound effects, etc. based on commands from the CPU 351, a sound buffer 372 for storing waveform data from the SPU 371, and a speaker 373 for outputting music sounds, sound effects, etc. generated by the SPU 371.

The SPU 371 has an ADPCM (adaptive differential PCM) function for reproducing 16-bit sound data which has been encoded as 4-bit differential sound data by ADPCM, a reproducing function for reproducing the waveform data stored in the sound buffer 372 to generate sound effects, etc., and a modulating function for modulating and reproducing the waveform data stored in the sound buffer 372.

The sound system 370 can be used as a sampling sound source which generates music sounds, sound effects, etc. based on the waveform data stored in the sound buffer 372 according to commands from the CPU 351.

The optical disk controller 380 comprises an optical disk drive 381 for reproducing application programs and data recorded on an optical disk such as a CD-ROM or the like, a decoder 382 for decoding programs and data that are recorded with an error correcting code added thereto, and a buffer 383 for temporarily storing data read from the optical disk drive 381 so as to allow the data from the optical disk to be read at a high speed. An auxiliary CPU 384 is connected to the decoder 382.

Sound data recorded on the optical disk which is read by the optical disk drive 381 includes PCM data converted from analog sound signals, in addition to the ADPCM data. The ADPCM data, which is recorded as 4-bit differential data of 16-bit digital data, is decoded by the decoder 382, supplied to the SPU 371, converted thereby into analog data, and applied to drive the speaker 373. The PCM data, which is recorded as 16-bit digital data, is decoded by the decoder 382 and then applied to drive the speaker 373.

The communication controller 390 comprises a communication control mechanism 391 for controlling communication with the CPU 351 via the bus 395, a controller connector 309 comprising slots 309A, 309B shown in FIG. 26 to which the manual controller 320 for entering instructions from the user is connected, and a pair of memory card insertion units or slots 308A, 308B (see also FIG. 26) for receiving the memory card 500 as an auxiliary memory device for storing game settings, etc. and the portable electronic device 400, the memory card insertion units 308A, 308B being controlled by the communication control mechanism 391.

The video game apparatus 301 of the above structure has the same function as the video game machine 2.

Specifically, the video game apparatus 301 sends application software recorded in the recording medium and used by the portable electronic device 400 to the portable electronic device 400 via the communication control mechanism 391. The video game apparatus 301 receives image data from the digital camera 4 that is connected via the serial I/O interface (SIO) 397, receives image data sent from the portable electronic device 400 via the communication control mechanism 391, and stores the received image data in the main memory 353. The video game apparatus 301 processes and combines the received data, and sends the processed and combined data back to the portable electronic device 400 or the digital camera 4.

As shown in FIG. 32, the portable electronic device 400 comprises a control means 441, an apparatus connection connector 442, an input means 443, a display means 444, a clock function unit 445, a nonvolatile memory 446, a speaker 447, a wireless communication means 448 and a radio reception means 449 as a data transmitting/receiving means, a battery 450, and a power supply terminal 451 and a diode 452 as a power supply means.

The control means 441 comprises a microcomputer, for example. The control means 441 functions as the CPU 31 of the portable computer 3. The control means 441 has a program memory 441a disposed therein as a program storage means.

The apparatus connection connector 442 serves as a communication means for connecting to a slot of another information-handling apparatus or the like. The apparatus connection connector 442 functions as the serial communication block 33 of the portable computer 3.

The input means 443 serves as the input block 37 of the portable computer 3. The input means 443 comprises control buttons for controlling a program stored in the program memory 441a.

The display means 444 serves as the display block 32 of the portable computer 3. The display means 444 comprises a liquid crystal display (LCD) unit or the like for displaying various items of information.

The clock function unit 445 is arranged to display time on the display means 444, for example.

The nonvolatile memory 446 serves to store various data. For example, the nonvolatile memory 446 comprises a semiconductor memory such as a flash memory which is capable of retaining stored data even when the portable electronic device 400 is turned off.

Since the portable electronic device 400 has the battery 450, the nonvolatile memory 446 may comprise a static random-access memory (SRAM) capable of storing and reading data at a high speed.

The nonvolatile memory 446 corresponds to the nonvolatile memory 34 of the portable computer 3, and stores application software supplied from the recording medium loaded in the video game apparatus 301 and used by the portable electronic device 400, image data supplied from the video game apparatus 301, and image data to be sent to the video game apparatus 301.

The portable electronic device 400 may have a memory (not shown) corresponding to the working memory 35 of the portable computer 3, for storing the above application software, image data, etc.

The battery 450 also allows the portable electronic device 400 to be operable independently even when the portable electronic device 400 is removed from the slots 307A, 307B in the casing 302 of the video game apparatus 301.

The battery 450 comprises a chargeable secondary battery. When the portable electronic device 400 is inserted in either one of the slots 307A, 307B in the casing 302 of the video game apparatus 301, the battery 450 is supplied with electric energy from the video game apparatus 301. Specifically, the battery 450 has a terminal connected to the power supply terminal 451 via a reverse-current prevention diode 452. When the portable electronic device 400 is connected to the casing 302, electric energy is supplied from the power supply terminal 451 via the reverse-current prevention diode 452 to the battery 450.

The wireless communication means 448 is arranged to have the wireless communication block 36 of the portable computer 3, i.e., to perform data communications with an external device through an infrared radiation or the like. The wireless communication means 448 is also arranged to receive various data sent from another memory card or the like.

The radio reception means 449 is arranged to receive various data transmitted by a radio broadcast, for example.

The speaker 447 is constructed as a sound generating means for generating sounds according to a program.

The above components or means of the portable electronic device 400 are connected to the control means 441, and are operated under the control of the control means 441.

FIG. 33 shows control items of the control means 441. As shown in FIG. 33, the control means 441 has an apparatus connection interface for connection to an information-handling apparatus, a memory interface for outputting data to and inputting data from a memory, a display interface, a control input interface, a sound interface, wireless communication interface, a clock management interface, and a program download interface.

The portable electronic device 400 has, in addition to the functions, described above, of the portable computer 3, a function to operate as a portable game apparatus when it runs a game application because of being equipped with the input means 443 such as control buttons for controlling a program to be executed and the display means 444 such as a liquid crystal display (LCD) unit or the like.

Since the portable electronic device 400 has a function to store an application program and a program supplied from the video game apparatus 301 in the program memory 441a in the microcomputer 441, application programs and various driver software that operate on the portable electronic device 400 can easily be changed.

The portable electronic device 400 of the above structure have the same function as the portable computer 3.

Specifically, the portable electronic device 400 stores application software supplied from the video game apparatus 301 in the nonvolatile memory 446. The portable electronic device 400 also receives image data sent from the video game apparatus 301 via the apparatus connection connector 442, and stores the received image data in the nonvolatile memory 446. The image data stored in the nonvolatile memory 446 is sent to the video game apparatus 301 via the apparatus connection connector 442.

The entertainment system as a specific example of the video game machine 2 and the portable computer 3 according to the present invention has been described above.

As described above, the data processing system 1 which comprises the video game machine 2 and the portable computer 3 allows data to be sent and received between the portable computer 3 and the digital camera 4 via the video game machine 2, and can function as the entertainment system.

Inasmuch as the video game apparatus 301 has a very high image data processing capability, the data processing system 1 can edit image data at a high speed, and can process data in response to commands inputted from the user based on the real-time processing capability of the video game apparatus 301.

As described above, a data processing system according to the present invention has a master unit for processing data and a slave unit removably connected to the master unit, the master unit having a first connecting means for connecting to an external imaging device, a second connecting means for connecting to the slave unit, and a control means for being supplied with multicolor, high-resolution image data from the imaging device via the first connecting means and outputting fewer-color, low-resolution image data based on the supplied image data from the master unit to the slave unit via the second connecting means.

The above data processing system allows the imaging device and the slave unit, which are difficult to connect directly to each other, to be simultaneously connected with the master unit for supplying the multicolor, high-resolution image data from the imaging device to the master unit and supplying the fewer-color, low-resolution image data based on the supplied image data from the master unit to the slave unit.

A data processing system according to the present invention has a master unit for processing data and a slave unit removably connected to the master unit, the master unit having a first connecting means for connecting to an external imaging device, a second connecting means for connecting to the slave unit, and a control means for being supplied with slave-unit image data from the slave unit via the second connecting means and outputting processed image data based on the slave-unit image data to the imaging device via the first connecting means.

The above data processing system allows the imaging device and the slave unit, which are difficult to connect directly to each other, to be simultaneously connected with the master unit for supplying the slave-unit image data from the slave unit to the master unit and supplying the processed image data based on the slave-unit image data from the master unit to the imaging device.

In the data processing system, the master unit has a data reading means for reading program data from a removably loaded recording medium, and the slave unit has an executing means for executing the program data. The master unit reads a slave-unit application program using processed image data from the recording medium with the data reading means and supplies the slave-unit application program to the slave unit via the second connecting means, and the slave unit executes the slave-unit application program with the executing means, using the processed image data supplied from the master unit.

Therefore, the data processing system allows the slave-unit application program for use by the slave unit to be supplied from the master unit and executed by the slave unit, and provides the slave unit with a function to read and use external image data.

A method of processing data with a master unit for processing data and a slave unit removably connected to the master unit, according to the present invention comprises the steps of supplying multicolor, high-resolution image data from an external imaging device to the master unit, and outputting fewer-color, low-resolution image data based on the supplied image data from the master unit to the slave unit.

The above method of processing data allows the imaging device and the slave unit, which are difficult to connect directly to each other, to be simultaneously connected with the master unit for supplying the multicolor, high-resolution image data from the imaging device to the master unit and supplying the fewer-color, low-resolution image data based on the supplied image data from the master unit to the slave unit.

A method of processing data with a master unit for processing data and a slave unit removably connected to the master unit, according to the present invention comprises the steps of supplying the master unit with slave-unit image data from the slave unit, and outputting processed image data based on the slave-unit image data from the master unit to an external imaging device.

The above method of processing data allows the imaging device and the slave unit, which are difficult to connect directly to each other, to be simultaneously connected with the master unit for supplying slave-unit image data from the slave unit to the master unit and supplying the processed image data based on the slave-unit image data from the master unit to the imaging device.

A method of processing data according to the present invention comprises the steps of reading a slave-unit application program using processed image data from a removably loaded recording medium and supplying the slave-unit application program from a master unit to a slave unit, and executing the slave-unit application program with the slave unit using the processed image data supplied from the master unit.

In the above method of processing data, the slave-unit application program which is used by the slave unit is supplied from the master unit, and executed by the slave unit. The slave unit is provided with a function to read and use external image data.

An entertainment system according to the present invention has a first connecting means for connecting to an external imaging device, with a slave unit being removably connected to the first connecting means, a second connecting means for connecting to the slave unit, and a control means for being supplied with multicolor, high-resolution image data from the imaging device via the first connecting means and outputting fewer-color, low-resolution image data based on the supplied image data to the slave unit via the second connecting means.

The above entertainment system allows the imaging device and the slave unit, which are difficult to connect directly to each other, to be simultaneously connected with the master unit for being supplied with the multicolor, high-resolution image data from the imaging device and outputting the fewer-color, low-resolution image data based on the supplied image data to the slave unit.

An entertainment system according to the present invention has a first connecting means for connecting to an external imaging device, with a slave unit being removably connected to the first connecting means, a second connecting means for connecting to the slave unit, and a control means for being supplied with slave-unit image data from the slave unit via the second connecting means and outputting processed image data based on the slave-unit image data to the imaging device via the first connecting means.

The above entertainment system allows the imaging device and the slave unit, which are difficult to connect directly to each other, to be simultaneously connected with the master unit for being supplied with the slave-unit image data from the slave unit and outputting the processed image data based on the slave-unit image data to the imaging device.

The entertainment system also has a data reading means for reading program data from a removably loaded recording medium. A slave-unit application program using processed image data is read from the recording medium by the data reading means, and supplied to the slave unit via the second connecting means.

The entertainment system allows the slave-unit application program used by the slave unit to be supplied to the slave unit.

Although certain preferred embodiments of the present invention have been shown and described in detail, it should be understood that various changes and modifications may be made therein without departing from the scope of the appended claims.

What is claimed is:

1. An entertainment system, comprising:
   a digital imaging device, comprising:
      an imaging unit for capturing multi-color, high-resolution image data; and
      a memory for storing the captured image data;
   a video game machine for playing video games, comprising:
      a first connector for connection to said imaging device for receiving the captured image data from said imaging device;
      a graphics processor for converting in real-time the captured image data from multi-color, high-resolution image data into fewer-color, low-resolution image data; and
      a second connector for connection to a personal digital assistant (PDA) for outputting the converted image data and an image processing application program for processing the converted image data to the PDA; the digital imaging device and the PDA being simultaneously connected to said first and second connectors, respectively; and
   the PDA, comprising:
      a control unit for executing said image processing application program to process the converted image data into processed image data; the control unit supplying the processed image data to said video game machine via the second connector; and
      a wireless communication unit for transmitting the processed image data to another PDA via wireless communication.

2. A data communication method for an entertainment system, comprising the steps of:
   capturing multi-color, high-resolution image data with an imaging device;
   transmitting said captured image data from said imaging device through a first connector to a video game machine for playing video games;
   converting in real-time the captured image data from multi-color, high-resolution image data into fewer-color, low-resolution image data using a graphics processor in said video game machine; and
   outputting the converted image data and an image processing application program for processing the converted image data through a second connector to a personal digital assistant (PDA); the digital imaging device and the PDA being simultaneously connected to said first and second connectors, respectively; and
   executing said image processing application program to process the converted image data into processed image data and supplying the processed image data to said video game machine via the second connector.

* * * * *